US008565935B2

(12) United States Patent
Mizutani et al.

(10) Patent No.: US 8,565,935 B2
(45) Date of Patent: Oct. 22, 2013

(54) LATERAL MOTION CONTROL APPARATUS FOR A VEHICLE

(75) Inventors: Yuichi Mizutani, Aichi-ken (JP); Hirofumi Nitta, Obu (JP); Yasuhiko Mukai, Anjo (JP); Mitsuhiro Tokimasa, Obu (JP); Junpei Tatsukawa, Chiryu (JP); Yoshihisa Ogata, Chiryu (JP); Hajime Kumabe, Kariya (JP); Masatoshi Hanzawa, Kariya (JP); Masaki Maruyama, Nagoya (JP)

(73) Assignees: Aisin Seiki Kabushiki Kaisha, Kariya-Shi, Aichi-Ken (JP); Denso Corporation, Kariya, Aichi-Pref. (JP); Advics Co., Ltd., Kariya, Aichi-Pref. (JP)

( * ) Notice: Subject to any disclaimer, the term of this patent is extended or adjusted under 35 U.S.C. 154(b) by 56 days.

(21) Appl. No.: 13/283,004

(22) Filed: Oct. 27, 2011

(65) Prior Publication Data

US 2012/0109416 A1    May 3, 2012

(30) Foreign Application Priority Data

Oct. 29, 2010    (JP) .................................. 2010-243415

(51) Int. Cl.
| G05D 1/00 | (2006.01) |
| G05D 3/00 | (2006.01) |
| G06F 7/00 | (2006.01) |
| G06F 17/00 | (2006.01) |

(52) U.S. Cl.
USPC ........................................................ 701/1

(58) Field of Classification Search
USPC ............................................................ 701/1
See application file for complete search history.

(56) References Cited

U.S. PATENT DOCUMENTS

| 4,062,509 | A | * | 12/1977 | Muhlfelder et al. | .......... 244/166 |
| 5,925,083 | A | * | 7/1999 | Ackermann | ..................... 701/41 |
| 7,143,864 | B2 | * | 12/2006 | Mattson et al. | ............... 180/446 |
| 2001/0032748 | A1 | * | 10/2001 | Demerly | ........................ 180/402 |
| 2006/0089770 | A1 | | 4/2006 | Ito | |
| 2009/0157262 | A1 | * | 6/2009 | Lee et al. | ........................ 701/42 |

FOREIGN PATENT DOCUMENTS

| JP | 10-278823 A | 10/1998 |
| JP | 2006-117181 A | 5/2006 |

* cited by examiner

*Primary Examiner* — Mary Cheung
*Assistant Examiner* — Frederick Brushaber
(74) *Attorney, Agent, or Firm* — Buchanan Ingersoll & Rooney PC

(57) ABSTRACT

The lateral motion control apparatus calculates lateral motion control amounts for a plurality of control targets that operate cooperatively in order to change the lateral motion amount of the vehicle based on a target value for the lateral motion amount of the vehicle, and control the plurality of control targets based on the calculated lateral motion control amounts. Meanwhile, it is determined whether or not the control of the plurality of control targets is to be stopped. When it has been determined that the control of the plurality of control targets is to be stopped, lateral motion degeneration control amounts are determined for each of the plurality of control targets so that the lateral motion control amounts of the plurality of control targets degenerate starting at that time, and the plurality of control targets are controlled based on the determined lateral motion degeneration control amounts.

2 Claims, 17 Drawing Sheets

LATERAL MOTION CONTROL APPARATUS FOR A VEHICLE

TECHNICAL FIELD

This disclosure relates to lateral motion control apparatuses that control the lateral motion, such as the yaw rate, of vehicles.

BACKGROUND DISCUSSION

In recent years, driving assistance apparatuses (called "driving assistance applications" hereinafter) that assist in the driving of a moving vehicle are being developed. For example, lane keep apparatuses that automatically steer or assist in driving so that vehicles travel along a road, lane departure prevention apparatuses that assist in driving by preventing vehicles from departing from their lanes, emergency avoidance apparatuses that automatically steer vehicles in order to avoid obstructions on the traveled road surface, and so on are being developed.

Request signals outputted from a driving assistance application such as a lane keep apparatus, a lane departure prevention apparatus, or an emergency avoidance apparatus (for example, a signal indicating a target lateral acceleration) are inputted into a lateral motion control apparatus that controls the amount of lateral motion (for example, the yaw rate) of the vehicle. Control signals are outputted from this control apparatus to a control target such as an actuator. The lateral motion of the vehicle is controlled as a result of the control target being controlled based on the control signals.

In the case where a driver has performed steering operations while the lateral motion of the vehicle is being controlled by the lateral motion control apparatus based on a request signal outputted from a driving assistance application (such interventional steering performed by the driver will be called "overriding"), the lateral motion control performed by the lateral motion control apparatus is stopped in order to give priority to the steering operations performed by the driver.

JP2006-117181A discloses a vehicle steering control apparatus that, when an electrical current instruction value for assistance control based on a steering torque has exceeded a determination reference value during an automatic steering mode, switches its steering mode from the automatic steering mode to a manual steering mode. Meanwhile, JP1998(H10)-278823A discloses a vehicle steering control apparatus that determines whether or not a present situation is a preparatory state for the start of steering control based on a preparatory operation performed by a driver and the travel conditions at that time. When the situation is the preparatory state, the vehicle steering control apparatus then determines whether or not the present situation is a starting state for steering control based on a starting operation performed by the driver and the travel conditions at that time. And when the situation is the starting state, the vehicle steering control apparatus commences the steering control.

SUMMARY

The lateral motion of a vehicle can be controlled by multiple actuators attached to the vehicle. For example, the lateral motion of a vehicle can be controlled by a front steering apparatus that steers the front wheels. The lateral motion of a vehicle can also be controlled by a rear steering apparatus that steers the rear wheels. Furthermore, the lateral motion of a vehicle can also be controlled by a braking apparatus that imparts a braking force on the vehicle, by adjusting the braking forces that act on individual wheels. It is possible to carry out integrated control of the lateral motion of a vehicle by causing the actuators that operate these various devices to function cooperatively.

In the case where an override has occurred when the lateral motion of a vehicle is being controlled by causing a plurality of control targets (actuators) to function cooperatively, or in the case where the plurality of control targets cannot be caused to function cooperatively for some reason, the lateral motion control of the vehicle is stopped. Because a plurality of control targets can interfere with each other with respect to the lateral motion of a vehicle, there is a problem in that, depending on the way in which the control of the plurality of control targets is stopped, the vehicle behavior will become unstable and a sense of discomfort will be imparted upon the driver. Thus, a need exists for a lateral motion control apparatus which is not susceptible to the drawback mentioned above.

According to the aspect of this disclosure, a lateral motion control apparatus includes: a target value obtaining unit (411) that obtains a target value ($\gamma^*$) of a lateral motion amount of a vehicle; a control amount calculation unit (414, 415, 416) that calculates, based on the target value of the lateral motion amount obtained by the target value obtaining unit, lateral motion control amounts for each of a plurality of control targets (14, 22, 32) that operate cooperatively in order to change the lateral motion amount of the vehicle; a control target control unit (42, 43, 44) that controls the plurality of control targets based on the lateral motion control amounts; a control stop determination unit (417, 4162a) that determines whether or not to stop the control of the plurality of control targets performed by the control target control unit; and a degeneration control amount determination unit (4162b) that, when the control stop determination unit has determined that the control of the plurality of control targets is to be stopped, determines lateral motion degeneration control amounts for each of the plurality of control targets so that the lateral motion control amounts of the plurality of control targets degenerate starting at that time. Furthermore, when the control stop determination unit has determined that the control of the plurality of control targets is to be stopped, the control target control unit controls the plurality of control targets based on the lateral motion degeneration control amount determined by the degeneration control amount determination unit.

BRIEF DESCRIPTION OF THE DRAWINGS

The foregoing and additional features and characteristic of this disclosure will become more apparent from the following detailed description considered with the reference to the accompanying drawings, wherein.

DETAILED DESCRIPTION (First Embodiment)

Figure 1:
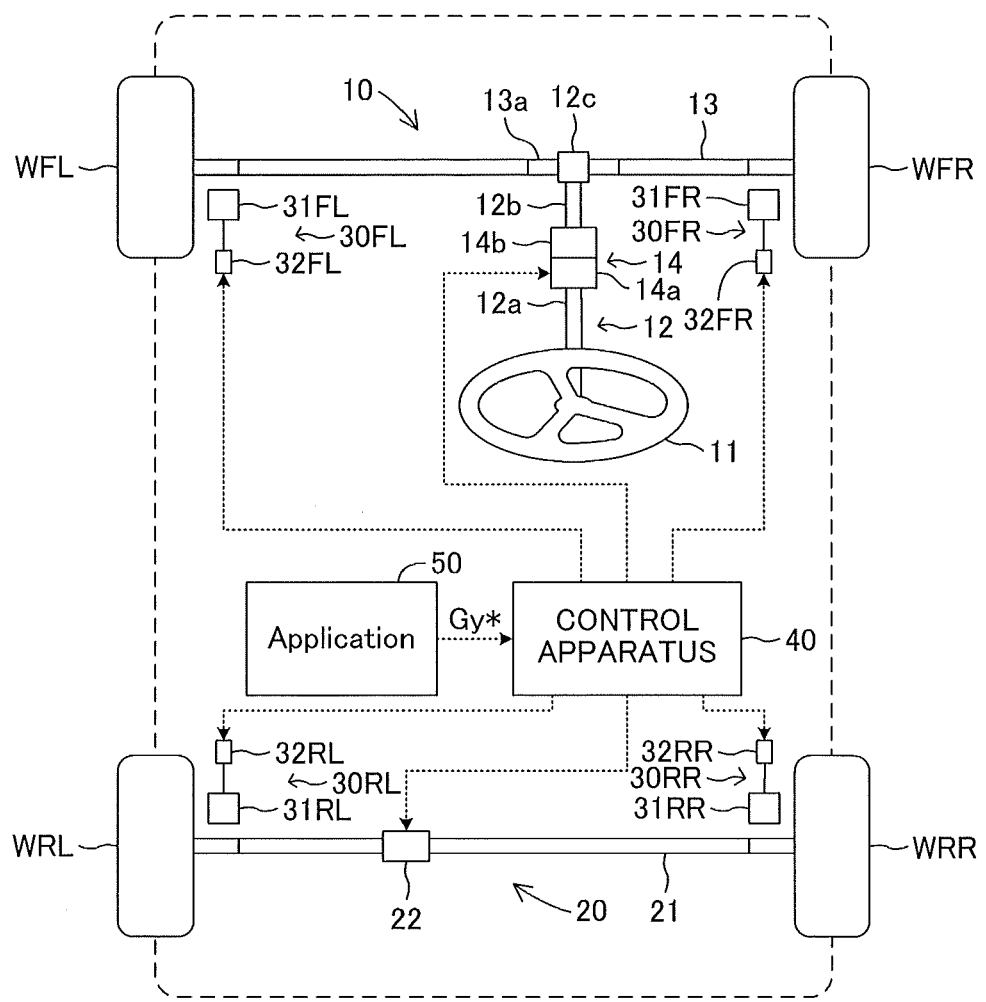
FIG. 1 is a schematic diagram illustrating a vehicle in which a lateral motion control apparatus according to an embodiment is installed.

Hereinafter, a first embodiment disclosed here will be described with reference to the drawings. FIG. 1 is a schematic diagram illustrating a vehicle in which a lateral motion control apparatus according to the present embodiment is installed. As shown in FIG. 1, this vehicle includes a front steering apparatus 10, a rear steering apparatus 20, and a braking apparatus 30 (a right-front wheel braking apparatus 30FR, a left-front wheel braking apparatus 30FL, a right-rear wheel braking apparatus 30RR, and a left-rear wheel braking apparatus 30RL). The front steering apparatus 10 applies a steering force to a right-front wheel WFR and a left-front wheel WFL, thus steering those wheels. The rear steering apparatus 20 applies a steering force to a left-rear wheel WRL and a right-rear wheel WRR, thus steering those wheels. The right-front wheel braking apparatus 30FR applies a braking force on the right-front wheel WFR. The left-front wheel braking apparatus 30FL applies a braking force on the left-front wheel WFL. The right-rear wheel braking apparatus 30RR applies a braking force on the right-rear wheel WRR. The left-rear wheel braking apparatus 30RL applies a braking force on the left-rear wheel WRL.

The front steering apparatus 10 includes a steering wheel 11, a steering shaft 12, a front-wheel steering rack 13, and a front steering actuator 14. The steering shaft 12 has an input-side steering shaft 12a and an output-side steering shaft 12b.

The input-side steering shaft 12a is connected at one end (the upper end) to the steering wheel 11, and rotates axially in response to an operation that rotates the steering wheel 11. In addition, the input-side steering shaft 12a is linked at its other end (the lower end) to one end of the output-side steering shaft 12b via the front steering actuator 14. Accordingly, the rotational force of the input-side steering shaft 12a is transmitted to the output-side steering shaft 12b via the front steering actuator 14. A pinion gear 12c is formed in the other end (the lower end) of the output-side steering shaft 12b. Furthermore, a rack gear 13a that meshes with the pinion gear 12c is formed in the front-wheel steering rack 13. A rack and pinion mechanism is thus configured by the pinion gear 12c and the rack gear 13a. This rack and pinion mechanism converts the rotational force of the output-side steering shaft 12b into linear force of the front-wheel steering rack 13. Accordingly, when the driver rotates the steering wheel 11, the front-wheel steering rack 13 moves in the linear direction. The ends of the front-wheel steering rack 13 are connected to the left-front wheel WFL and the right-front wheel WFR, respectively, via tie rods. Therefore, the front wheels are steered when the driver rotates the steering wheel 11 and the front-wheel steering rack 13 moves in the linear direction.

Meanwhile, the front steering actuator 14 includes a first actuator 14a and a second actuator 14b. The first actuator 14a is configured of, for example, a reducer and an electric motor. The first actuator 14a is attached to the input-side steering shaft 12a via, for example, a gear mechanism. The input-side steering shaft 12a is rotated as a result of the first actuator 14a rotating. Therefore, the front wheels can be steered automatically by driving the first actuator 14a even if the driver is not rotating the steering wheel 11. The first actuator 14a can also generate an assistance force for aiding the driver in rotating the steering wheel 11.

The second actuator 14b can be configured of, for example, a reducer and an electric motor. In this case, the casing of the electric motor is linked to the one end (the lower end) of the input-side steering shaft 12a, and a rotor of the electric motor is linked to the output-side steering shaft 12b via the reducer. Accordingly, when the input-side steering shaft 12a rotates, that rotational force is transmitted to the output-side steering shaft 12b via the second actuator 14b. Furthermore, when the rotor of the electric motor that partially configures the second actuator 14b rotates relative to the casing, the output-side steering shaft 12b is rotated and the front wheels are automatically steered without the input-side steering shaft 12a rotating.

The rear steering apparatus 20 includes a rear-wheel steering rack 21 and a rear steering actuator 22. The rear-wheel steering rack 21 is connected to the left-rear wheel WRL and the right-rear wheel WRR. The rear steering actuator 22 is attached to the rear-wheel steering rack 21. The rear steering actuator 22 is configured of, for example, an electric motor and a ball screw mechanism. The ball screw mechanism has a ball screw nut and a ball screw rod. The ball screw rod forms part of the rear-wheel steering rack 21. The ball screw nut is linked to the rotor of the electric motor so as to be capable of rotating integrally therewith. When the ball screw nut rotates due to the rotation of the electric motor, that rotational force is converted by the ball screw mechanism into linear force of the rear-wheel steering rack 21. Therefore, the rear-wheel steering rack 21 moves in the linear direction due to driving of the rear steering actuator 22, and thus the rear wheels are automatically steered.

The braking apparatuses 30FR, 30FL, 30RR, and 30RL (collectively, these are referred to as the "braking apparatus 30") include braking mechanisms 31FR, 31FL, 31RR, and 31RL for applying braking forces to their corresponding wheels WFR, WFL, WRR, and WRL. The braking mechanisms 31FR, 31FL, 31RR, and 31RL operate in response to the driver depressing a brake pedal. The braking mechanisms 31FR, 31FL, 31RR, and 31RL can be configured of, for example, disc rotors that rotate coaxially with the wheels WFR, WFL, WRR, and WRL, brake pads disposed so as to be capable of making contact with the disc rotors, pistons that apply a compressive force to the brake pads, hydraulic circuits that transmit, to the pistons, the depressive force applied to the brake pedal boosted by a brake booster (not shown), and so on.

DYC (Dynamic Yaw Control) actuators 32FR, 32FL, 32RR, and 32RL are attached to the braking mechanisms 31FR, 31FL, 31RR and 31RL. The DYC actuators are actuators that can apply a braking force or a driving force to the individual wheels. In the present embodiment, the DYC actuators are brake actuators that can apply a braking force to the individual wheels. The braking mechanisms 31FR, 31FL, 31RR, and 31RL are also operated due to the operation of the DYC actuators 32FR, 32FL, 32RR, and 32RL, thus applying braking forces to the wheels WFR, WFL, WRR, and WRL independently. The DYC actuators 32FR, 32FL, 32RR, and 32RL operate independently from the depression of the brake pedal when control signals are issued from a lateral motion control apparatus, which will be discussed later. Braking forces are applied automatically to the wheels WFR, WFL, WRR, and WRL as a result. The DYC actuators 32FR, 32FL, 32RR, and 32RL can be configured of, for example, pressure pumps, pressurizing valves and depressurizing valves interposed within the aforementioned hydraulic circuit, or the like. Hereinafter, when referring collectively to the DYC actuators 32FR, 32FL, 32RR, and 32RL, or when specifying a single or a plurality of DYC actuators 32FR, 32FL, 32RR, and 32RL, the term "DYC actuator 32" will be used.

Although in this embodiment, the DYC actuator 32 is an actuator for applying a braking force to individual wheels, it should be noted that the DYC actuator 32 may be an actuator for applying a driving force or a regenerative braking force to the individual wheels. For example, if the vehicle is provided with in-wheel type motors, the in-wheel type motors may be DYC actuators.

The front steering actuator 14, the rear steering actuator 22, and the DYC actuator 32 are electrically connected to a lateral motion control apparatus 40, respectively. The lateral motion control apparatus 40 is configured of a microcomputer including a ROM, a RAM, and a CPU, and outputs operation signals to the respective actuators. The lateral motion control apparatus 40 carries out integrated control of the lateral motion of the vehicle by causing the respective actuators to operate cooperatively.

In addition, the vehicle is provided with a driving assistance application 50. The driving assistance application 50 calculates a lateral acceleration (target lateral acceleration) Gy* required by the present traveling vehicle for traveling along its lane. The target lateral acceleration Gy* calculated by the driving assistance application 50 is inputted into the lateral motion control apparatus 40. The lateral motion control apparatus 40 outputs operation signals to the respective actuators 14, 22, and 32 based on the inputted target lateral acceleration Gy*.

Figure 2:
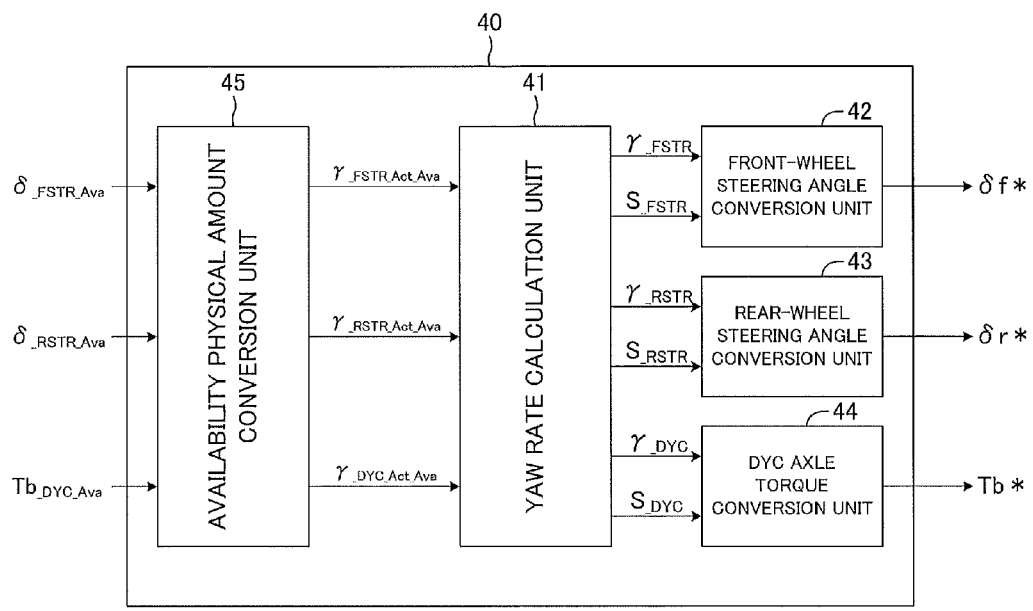
FIG. 2 is a diagram illustrating the functional configuration of a lateral motion control apparatus.

FIG. 2 is a diagram illustrating the functional configuration of the lateral motion control apparatus 40. The lateral motion control apparatus 40 according to the present embodiment controls the yaw rate of the vehicle. As shown in FIG. 2, the lateral motion control apparatus 40 includes an availability physical amount conversion unit 45, a yaw rate calculation unit 41, a front-wheel steering angle conversion unit 42, a rear-wheel steering conversion unit 43, and a DYC axle torque conversion unit 44.

The availability physical amount conversion unit 45 takes, as its inputs, a front steering availability steering angle $\delta_{\_FSTR\_Ava}$, a rear steering availability steering angle $\delta_{\_RSTR\_Ava}$ and a DYC availability torque $Tb_{\_DYC\_Ava}$. The front steering availability steering angle $\delta_{\_FSTR\_Ava}$ indicates a steering angular amount by which the front wheels can be steered from a current steering state by operation (actuation) of the front steering actuator 14. The rear steering availability steering angle $\delta_{\_RSTR\_Ava}$ indicates a steering angular amount by which the rear wheels can be steered from a current steering state by operation (actuation) of the rear steering actuator 22. The DYC availability torque $Tb_{\_DYC\_Ava}$ indicates an axle torque amount that can be applied to an axle controlled by operation (actuation) of the DYC actuator 32.

The front steering availability steering angle $\delta_{\_FSTR\_Ava}$ can be found based on the current steering angle of the front wheels and the maximum steering angle of the front wheels. The rear steering availability steering angle $\delta_{\_RSTR\_Ava}$ can be found based on the current steering angle of the rear wheels and the maximum steering angle of the rear wheels. The DYC availability torque $Tb_{\_DYC\_Ava}$ can be found based on an axle torque currently acting on the axle and the maximum value of the axle torque that can act on that axle.

In addition, the availability physical amount conversion unit 45 calculates a front steering availability theoretical yaw rate $\gamma_{\_FSTR\_Act\_Ava}$, a rear steering availability theoretical yaw rate $\gamma_{\_RSTR\_Act\_Ava}$, and a DYC availability theoretical yaw rate $\gamma_{\_DCY\_Act\_Ava}$ based on the inputted front steering availability steering angle $\delta_{\_FSTR\_Ava}$, rear steering availability steering angle $\delta_{\_RSTR\_Ava}$, and DYC availability torque $Tb_{\_DYC\_Ava}$. The availability theoretical yaw rates calculated by the availability physical amount conversion unit 45 are outputted to the yaw rate calculation unit 41. The front steering availability theoretical yaw rate $\gamma_{\_FSTR\_Act\_Ava}$ indicates a maximum value (or range) for the yaw rate that can theoretically be elicited when the steering angle of the front wheels changes within a range represented by the front steering availability steering angle $\delta_{\_FSTR\_Ava}$. The rear steering availability theoretical yaw rate $\gamma_{\_RSTR\_Act\_Ava}$ indicates a maximum value (or range) for the yaw rate that can theoretically be elicited when the steering angle of the rear wheels changes within a range represented by the rear steering availability steering angle $\delta_{\_RSTR\_Ava}$. The DYC availability theoretical yaw rate $\gamma_{\_DYC\_Act\_Ava}$ indicates a maximum value (or range) for the yaw rate that can theoretically be elicited when the axle torque changes within a range represented by the DYC availability torque $Tb_{\_DYC\_Ava}$.

The yaw rate calculation unit 41 calculates a front steering yaw rate control amount $\delta_{\_FSTR}$ (where FSTR indicates the front steering actuator 14), a rear steering yaw rate control amount $\gamma_{\_RSTR}$ (where RSTR indicates the rear steering actuator 22), and a DYC yaw rate control amount $\gamma_{\_DCY}$ (where DYC indicates the DYC actuator 32), based on the target lateral acceleration Gy* inputted from the driving assistance application 50, and outputs these yaw rate control amounts. The front steering yaw rate control amount $\gamma\_{FSTR}$ is a target control amount for the yaw rate elicited in the vehicle when the front steering actuator 14 (front steering apparatus 10) operates and steers the front wheels WFR and WFL. The rear steering yaw rate control amount $\gamma\_{RSTR}$ is a target control amount for the yaw rate elicited in the vehicle when the rear steering actuator 22 (rear steering apparatus 20) operates and steers the rear wheels WRR and WRL. The DYC yaw rate control amount $\gamma\_{DYC}$ is a target control amount for the yaw rate elicited in the vehicle when the DYC actuator 32 (braking apparatus 30) operates and applies a braking force to one of the wheels, and in particular, to one of the right-rear wheel WRR and left-rear wheel WRL.

The yaw rate calculation unit 41 outputs a front steering actuation request signal $S\_{FSTR}$, a rear steering actuation request signal $S\_{RSTR}$, and a DYC actuation request signal $S\_{DYC}$. The front steering actuation request signal $S\_{FSTR}$ is a signal for requesting the front steering actuator 14 to operate for yaw rate control. The rear steering actuation request signal $S\_{RSTR}$ is a signal for requesting the rear steering actuator 22 to operate for yaw rate control. The DYC actuation request signal $S\_{DYC}$ is a signal for requesting the DYC actuator 32 to operate for yaw rate control.

Figure 3:
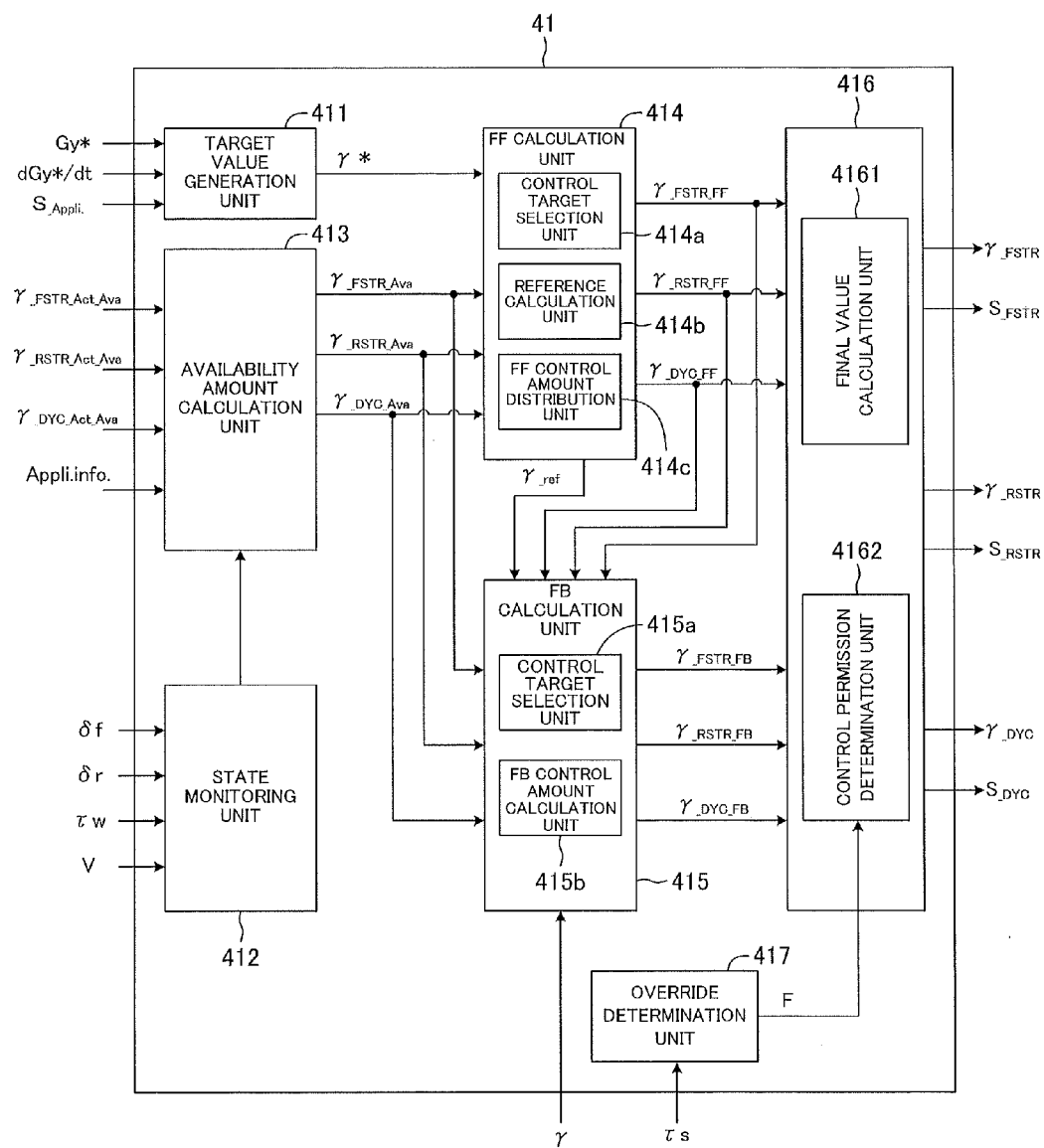
FIG. 3 is a diagram illustrating the functional configuration of a yaw rate calculation unit.

FIG. 3 is a diagram illustrating the functional configuration of the yaw rate calculation unit 41. As shown in FIG. 3, the yaw rate calculation unit 41 includes a target value generation unit 411, a state monitoring unit 412, an availability amount calculation unit 413, a feed-forward (FF) calculation unit 414, a feedback (FB) calculation unit 415, a resolution unit 416, and an override determination unit 417.

The target value generation unit 411 takes, as its input, the target lateral acceleration Gy* from the driving assistance application 50, and calculates a target yaw rate γ* to be elicited in the vehicle based on the inputted target lateral acceleration Gy* so that the lateral acceleration acting on the vehicle becomes the target lateral acceleration Gy*. The target yaw rate γ* can be calculated by, for example, dividing the target lateral acceleration Gy* by a vehicle speed V and then subtracting, from that value, a time derivative value of a vehicle body slip angle β (dβ/dt). In addition, the target value generation unit 411 may take, as its input, a change amount of the target lateral acceleration Gy*(dGy*/dt), an application execution request signal $S\_{Appli.}$, and so on from the driving assistance application 50. The target lateral acceleration change amount dGy*/dt is used in order to calculate the target yaw rate γ*. The application execution request signal $S\_{Appli.}$ is a signal for requesting the yaw rate to be controlled based on the target lateral acceleration Gy* outputted from the driving assistance application 50.

The state monitoring unit 412 takes, as its inputs, a front wheel steering angle δf from a front wheel steering angle sensor attached to the vehicle, a rear wheel steering angle δr from a rear wheel steering angle sensor, a wheel torque Tw of each of the wheels from torque sensors attached to the respective wheels, and the vehicle speed V from a vehicle speed sensor. The state monitoring unit 412 estimates the current state of the vehicle based on the inputted information. In vehicle motion control, it is important to determine whether or not lateral motion is occurring in the light of safety, and to estimate the elicited lateral motion amount in the light of performance. Therefore the state monitoring unit 412 outputs one or more of cornering powers Cfr, Cfl, Crr, and Crl for the respective wheels, a yaw rate, a lateral acceleration, a road surface μ, and a slip rate s that can occur in the vehicle as benchmarks indicating the estimated state of the vehicle. The amount of outputted information may be selected as appropriate based on the capabilities of the application, the sensors attached to the vehicle, and so on; and not particularly limited thereto.

The availability amount calculation unit 413 takes, as its input, the current state of the vehicle from the state monitoring unit 412. The availability amount calculation unit 413 also takes as inputs the front steering availability theoretical yaw rate $\gamma\_{FSTR\_Act\_Ava}$, the rear steering availability theoretical yaw rate $\gamma\_{RSTR\_Act\_Ava}$, and the DYC availability theoretical yaw rate $\gamma\_{DYC\_Act\_Ava}$. Furthermore, the availability amount calculation unit 413 takes application information from the driving assistance application 50 as an input. The application information is, for example, information indicating whether or not the actuators can be used, or information representing yaw rate control characteristics.

The availability amount calculation unit 413 then calculates a front steering availability yaw rate $\gamma\_{FSTR\_Ava}$, a rear steering availability yaw rate $\gamma\_{RSTR\_Ava}$, and a DYC availability yaw rate $\gamma\_{DYC\_Ava}$ based on the above-mentioned vehicle state, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, and the application information.

The front steering availability yaw rate $\gamma\_{FSTR\_Ava}$ indicates a maximum value (or range) for the yaw rate that can actually be elicited in the vehicle when the front steering actuator 14 operates, in the case where the vehicle state and the application information are taken into consideration. The rear steering availability yaw rate $\gamma\_{RSTR\_Ava}$ indicates a maximum value (or range) for the yaw rate that can actually be elicited in the vehicle when the rear steering actuator 22 operates, in the case where the vehicle state and the application information are taken into consideration. The DYC availability yaw rate $\gamma\_{DYC\_Ava}$ indicates a maximum value (or range) for the yaw rate that can actually be elicited in the vehicle when the DYC actuator 32 operates, in the case where the vehicle state and the application information are taken into consideration. A table that represents correspondence relationships between the various availability yaw rates, the vehicle state, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, and so on is stored in the availability amount calculation unit 413. The respective availability yaw rates are calculated based on the various pieces of inputted information by referring to the above-mentioned table.

The feed-forward calculation unit 414 takes, as its inputs, the target yaw rate γ* and the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$). Meanwhile, the feed-forward calculation unit 414 includes a control target selection unit 414a, a reference calculation unit 414b, and a feed-forward control amount distribution unit 414c.

The control target selection unit 414a selects an actuator (control target) that can be used in the vehicle yaw rate control based on the respective availability yaw rates. The control target selection unit 414a determines a priority order for the usable actuators. In this case, for example, when application information representing emphasis on the responsiveness of yaw rate control is inputted into the availability amount calculation unit 413, the priority order is determined so that the actuator with the fastest response (for example, the DYC actuator 32) has the highest priority, the actuator with the next-fastest response (for example, the front steering actuator 14) has the second-highest priority, and the actuator with the slowest response (for example, the rear steering actuator 22) has the third-highest priority.

The reference calculation unit 414b takes as an input the target yaw rate γ* from the target value generation unit 411, and calculates a feed-forward yaw rate reference amount $\gamma\_{ref}$ that simulates vehicle response delay by executing a reference calculation on the target yaw rate γ*. Because it is used in feedback calculation, the feed-forward yaw rate reference amount $\gamma\_{ref}$ is outputted to the feedback calculation unit 415.

The feed-forward control amount distribution unit 414c distributes a feed-forward yaw rate control amount $\gamma\_{FF}$ calculated based on the feed-forward yaw rate reference amount $\gamma\_{ref}$ calculated by the reference calculation unit 414b as a front steering feed-forward yaw rate control amount $\gamma\_{FSTR\_FF}$, a rear steering feed-forward yaw rate control amount $\gamma\_{RSTR\_FF}$, and a DYC feed-forward yaw rate control amount $\gamma\_{DYC\_FF}$. The front steering feed-forward yaw rate control amount $\gamma\_{FSTR\_FF}$ is a feed-forward control amount for a yaw rate elicited in the vehicle by actuating the front steering actuator 14. The rear steering feed-forward yaw rate control amount $\gamma\_{RSTR\_FF}$ is a feed-forward control amount for a yaw rate elicited in the vehicle by actuating the rear steering actuator 22. The DYC feed-forward yaw rate control amount $\gamma\_{DYC\_FF}$ is a feed-forward control amount for a yaw rate elicited in the vehicle by actuating the DYC actuator 32.

In this case, the feed-forward control amount distribution unit 414c distributes the feed-forward yaw rate control amount $\gamma\_{FF}$ based on the priority order determined by the control target selection unit 414a and the respective availability yaw rates. For example, in the case where the calculated feed-forward yaw rate control amount $\gamma\_{FF}$ is 10, the front steering actuator 14 has the highest priority, the rear steering actuator 22 has the second-highest priority, the DYC actuator 32 has the third-highest priority, the front steering availability yaw rate $\gamma\_{FSTR\_Ava}$ is 6, the rear steering availability yaw rate $\gamma\_{RSTR\_Ava}$ is 3, and the DYC availability yaw rate $\gamma\_{DYC\_Ava}$ is 3; in this case, the feed-forward yaw rate control amount $\gamma\_{FF}$ is distributed so that the front steering feed-forward yaw rate control amount $\gamma\_{FSTR\_FF}$ is 6, the rear steering feed-forward yaw rate control amount $\gamma\_{RSTR\_FF}$ is 3, and the DYC feed-forward yaw rate control amount $\gamma\_{DYC\_FF}$ is 1. The respective distributed feed-forward yaw rate control amounts are then outputted to the feedback calculation unit 415 and the resolution unit 416.

The feedback calculation unit 415 takes as its inputs the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$) from the availability amount calculation unit 413, the respective feed-forward yaw rate control amounts (the front steering feed-forward yaw rate control amount $\gamma\_{FSTR\_FF}$, the rear steering feed-forward yaw rate control amount $\gamma\_{RSTR\_FF}$, and the DYC feed-forward yaw rate control amount $\gamma\_{DYC\_FF}$) from the feed-forward calculation unit 414, the feed-forward yaw rate reference amount $\gamma\_{ref}$ and a yaw rate γ from a yaw rate sensor attached to the vehicle. Meanwhile, the feedback calculation unit 415 includes a control target selection unit 415a and a feedback control amount calculation unit 415b.

The control target selection unit 415a selects actuators that can be used in the vehicle yaw rate control based on an allowance amount calculated from the respective availability yaw rates and the respective feed-forward yaw rate control amounts. The control target selection unit 415a also determines a priority order for the usable actuators.

The feedback control amount calculation unit 415b controls the vehicle yaw rate through feedback based on the deviation $\Delta\gamma(=\gamma\_{ref}-\gamma)$ between the inputted feed-forward yaw rate reference amount $\gamma\_{ref}$ and yaw rate γ. For example, in the case where the feedback control is PID control, a feedback yaw rate control amount $\gamma\_{FB}$ is calculated through the following Equation (1).

$$\gamma_{FB} = K_p \cdot \Delta\gamma + K_i \cdot \int \Delta\gamma dt + K_d \cdot \frac{d\Delta\gamma}{dt} \qquad (1)$$

In the above Equation (1), $K_p$ indicates a proportional gain, $K_i$ indicates an integrated gain, and $K_d$ indicates a derivative gain.

Furthermore, the feedback control amount calculation unit 415b distributes the calculated feedback yaw rate control amount $\gamma\_{FB}$ as a front steering feedback yaw rate control amount $\gamma\_{FSTR\_FB}$, a rear steering feedback yaw rate control amount $\gamma\_{RSTR\_FB}$, and a DYC feedback yaw rate control amount $\gamma\_{DYC\_FB}$. The front steering feedback yaw rate control amount $\gamma\_{FSTR\_FB}$ is a feedback control amount for a yaw rate caused to occur in the vehicle by actuating the front steering actuator. The rear steering feedback yaw rate control amount $\gamma\_{RSTR\_FB}$ is a feedback control amount for a yaw rate caused to occur in the vehicle by actuating the rear steering actuator 22. The DYC feedback yaw rate control amount $\gamma\_{DYC\_FB}$ is a feedback control amount for a yaw rate caused to occur in the vehicle by actuating the DYC actuator 32.

In this case, the feedback control amount calculation unit 415b distributes the feedback yaw rate control amount $\gamma\_{FB}$ in accordance with the priority order for usable actuators determined by the control target selection unit 415a. The feedback control amount calculation unit 415b then outputs the distributed feedback yaw rate control amounts (the front steering feedback yaw rate control amount $\gamma\_{FSTR\_FB}$, the rear steering feedback yaw rate control amount $\gamma\_{RSTR\_FB}$, and the DYC feedback yaw rate control amount $\gamma\_{DYC\_FB}$) to the resolution unit 416.

The resolution unit 416 includes a final value calculation unit 4161 and a control permission determination unit 4162. The final value calculation unit 4161 calculates the front steering yaw rate control amount $\gamma\_{FSTR}$ by adding the front steering feed-forward yaw rate control amount $\gamma\_{FSTR\_FF}$ inputted from the feed-forward calculation unit 414 with the front steering feedback yaw rate control amount $\gamma\_{FSTR\_FB}$ inputted from the feedback calculation unit 415. The calculated front steering yaw rate control amount $\gamma\_{FSTR}$ and the front steering actuation request signal $S\_{RSTR}$ for requesting the front steering actuator 14 to actuate are then outputted to the front-wheel steering angle conversion unit 42. The resolution unit 416 calculates the rear steering yaw rate control amount $\gamma\_{RSTR}$ by adding the rear steering feed-forward yaw rate control amount $\gamma\_{RSTR\_FF}$ inputted from the feed-forward calculation unit 414 with the rear steering feedback yaw rate control amount $\gamma\_{RSTR\_FB}$ inputted from the feedback calculation unit 415. The calculated rear steering yaw rate control amount $\gamma\_{RSTR}$ and the rear steering actuation request signal $S\_{RSTR}$ for requesting the rear steering actuator 22 to actuate are then outputted to the rear-wheel steering conversion unit 43. Furthermore, the resolution unit 416 calculates the DYC yaw rate control amount $\gamma\_{DYC}$ by adding the DYC feed-forward yaw rate control amount $\gamma\_{DYC\_FF}$ inputted from the feed-forward calculation unit 414 with the DYC feedback yaw rate control amount $\gamma\_{DYC\_FB}$ inputted from the feedback calculation unit 415. The calculated DYC yaw rate control amount $\gamma_{\_DYC}$ and the DYC actuation request signal $S_{\_DYC}$ for requesting the DYC actuator 32 to actuate are then outputted to the DYC axle torque conversion unit 44.

As shown in FIG. 2, the front-wheel steering angle conversion unit 42 takes the front steering yaw rate control amount $\gamma_{\_FSTR}$ as its input. In addition, a front wheel target steering angle δf* necessary to elicit a yaw rate corresponding to the front steering yaw rate control amount $\gamma_{\_FSTR}$ in the vehicle through actuation of the front steering actuator 14 is calculated. A signal representing the calculated front wheel target steering angle δf* is then outputted to the front steering actuator 14. Due to this output signal, the actuation of the front steering actuator 14 is controlled so that the front wheel steering angle of becomes the front wheel target steering angle of*, or in other words, so that a yaw rate corresponding to the front steering yaw rate control amount $\gamma_{\_FSTR}$ is generated in the vehicle through actuation of the front steering actuator 14.

The rear-wheel steering conversion unit 43 takes the rear steering yaw rate control amount $\gamma_{\_RSTR}$ as its input. In addition, a rear wheel target steering angle δr* necessary to elicit a yaw rate corresponding to the rear steering yaw rate control amount $\gamma_{\_RSTR}$ in the vehicle through actuation of the rear steering actuator 22 is calculated. A signal representing the calculated rear wheel target steering angle δr* is then outputted to the rear steering actuator 22. Due to this output signal, the actuation of the rear steering actuator 22 is controlled so that the rear wheel steering angle δr becomes the rear wheel target steering angle δr*, or in other words, so that a yaw rate corresponding to the rear steering yaw rate control amount $\gamma_{\_RSTR}$ is generated in the vehicle through actuation of the rear steering actuator 22.

The DYC axle torque conversion unit 44 takes the DYC yaw rate control amount $\gamma_{\_DYC}$ as its input. In addition, a target DYC torque Tb* necessary to elicit a yaw rate corresponding to the DYC yaw rate control amount $\gamma_{\_DYC}$ in the vehicle through actuation of the DYC actuator 32 is calculated. A signal representing the calculated target DYC torque Tb* is then outputted to the DYC actuator 32 that applies the braking force to the wheel on turning inside among the wheels. Due to this output signal, the actuation of the DYC actuator 32 is controlled so that an axle torque Tb acting on the wheel on turning inside becomes the target DYC torque Tb*, or in other words, so that a yaw rate corresponding to the DYC yaw rate control amount $\gamma_{\_DYC}$ is generated in the vehicle through actuation of the DYC actuator 32.

As a result of the cooperative control of the plurality of actuators (the front steering actuator 14, the rear steering actuator 22, and the DYC actuator 32), the yaw rate (lateral motion amount) of the vehicle is controlled so that the target lateral acceleration Gy* inputted from the driving assistance application 50 is generated in the vehicle.

Meanwhile, as shown in FIG. 3, the yaw rate calculation unit 41 includes the override determination unit 417. The override determination unit 417 takes, as its input, a steering torque TS from a steering torque sensor attached to the vehicle. The inputted steering torque TS is then compared to a threshold value $TS_{th}$ for the steering torque TS, and it is then determined whether or not an override is occurring based on the results of the comparison.

Figure 4:
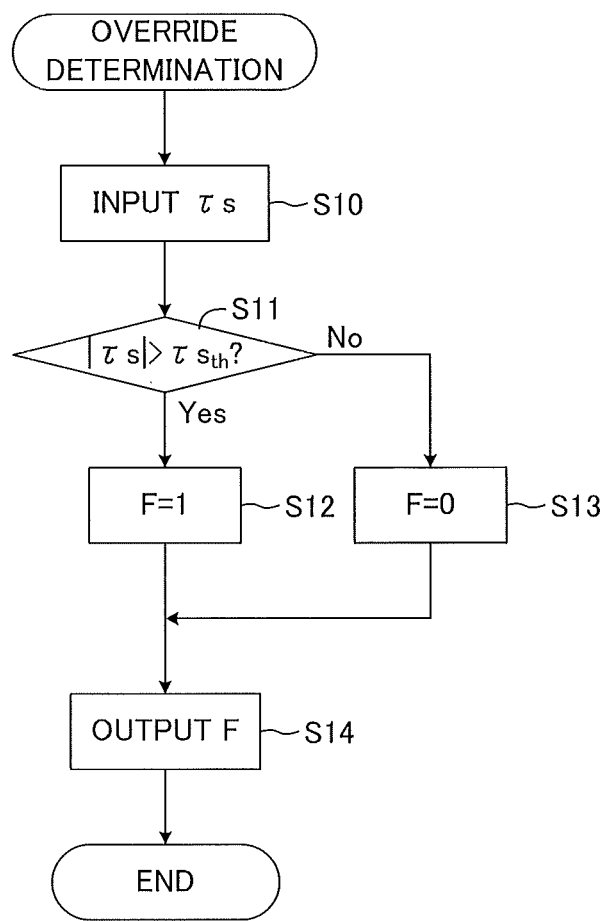
FIG. 4 is a flowchart illustrating an override determination routine executed by an override determination unit.

FIG. 4 is a flowchart illustrating an override determination routine executed by the override determination unit 417. This routine is launched when the lateral motion control apparatus 40 begins the lateral motion control of the vehicle, and is repeatedly executed every predetermined short amount of time. When the routine is launched, firstly in S (Step) 10 of FIG. 4, the override determination unit 417 takes the steering torque is as its input. Next, it is determined whether or not an absolute value |TS| representing the magnitude of the steering torque is greater than the pre-set threshold value $TS_{th}$ (S11). In the case where the absolute value |TS| is greater than the threshold value $TS_{th}$ (S11: Yes), the override determination unit 417 advances to S12 and sets an override determination flag F to 1. However, in the case where the absolute value |TS| is less than or equal to the threshold value $TS_{th}$ (S11: No), the override determination unit 417 advances to S13 and sets the override determination flag F to 0. After the override determination flag F has been set to 0 or 1 in S12 or S13, the override determination flag F is outputted (S14). Thereafter, the routine ends.

Figure 5:
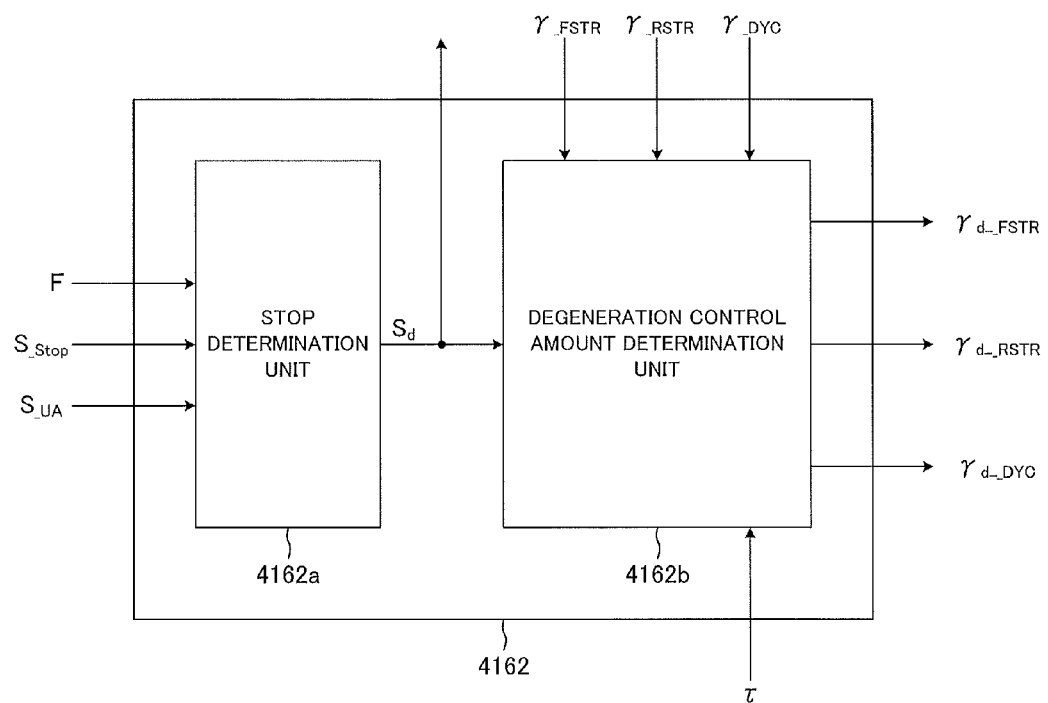
FIG. 5 is a diagram illustrating the functional configuration of a control permission determination unit.

As shown in FIG. 3, the override determination flag F set by the override determination unit 417 is inputted into the control permission determination unit 4162 of the resolution unit 416. FIG. 5 is a diagram illustrating the functional configuration of the control permission determination unit 4162. As shown in FIG. 5, the control permission determination unit 4162 includes a stop determination unit 4162a and a degeneration control amount determination unit 4162b.

Figure 6:
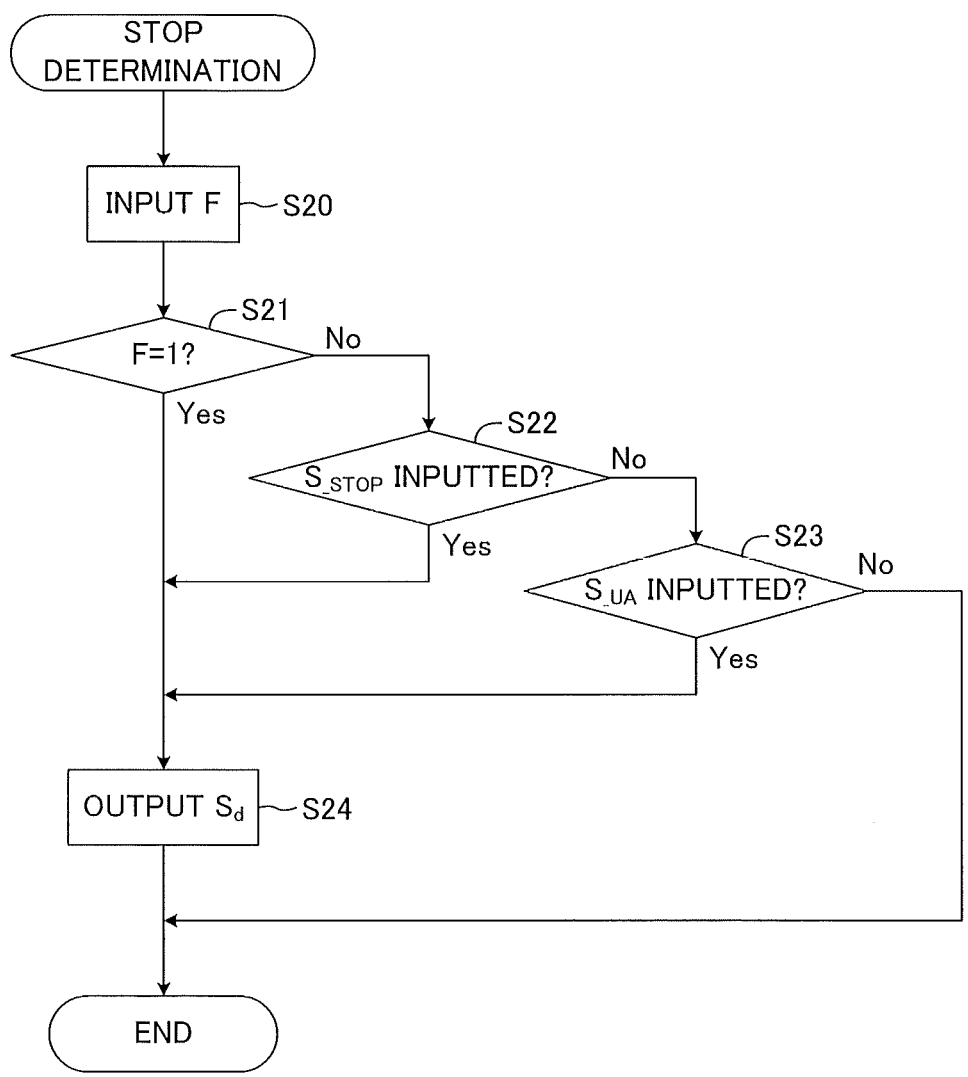
FIG. 6 is a flowchart illustrating a control stop determination routine executed by a stop determination unit in order to determine whether or not to stop lateral motion control.

The stop determination unit 4162a determines whether or not to stop the lateral motion control of the vehicle performed by the lateral motion control apparatus 40. The override determination flag F, a stop request signal $S_{\_STOP}$, and a control rejection signal $S_{\_UA}$ are inputted into the stop determination unit 4162a. FIG. 6 is a flowchart illustrating a control stop determination routine executed by the stop determination unit 4162a in order to determine whether or not to stop lateral motion control. This routine is launched when the lateral motion control apparatus 40 begins the lateral motion control of the vehicle.

When the routine is launched, firstly in S20 of FIG. 6, the stop determination unit 4162a takes the override determination flag F as its input. Next, it is determined whether or not the inputted override determination flag F is set to 1 (S21). In the case where the override determination flag F is set to 1, or in other words, in the case where an override is occurring (S21: Yes), the stop determination unit 4162a determines that the control of the respective actuators is to be stopped, advances to S24, and outputs a degeneration request signal $S_d$. Thereafter, the routine ends.

Meanwhile, in the case where the override determination flag F is not set to 1, or in other words, in the case where an override is not occurring (S21: No), the stop determination unit 4162a advances to S22, where it is determined whether or not the stop request signal $S_{\_STOP}$ is being inputted. The stop request signal $S_{\_STOP}$ is a signal for stopping the lateral motion control regardless of whether or not an override is occurring. The stop request signal $S_{\_STOP}$ may be inputted by the driver of the vehicle. Alternatively, the stop request signal $S_{\_STOP}$ may be inputted from the driving assistance application 50. In the case where the stop request signal $S_{\_STOP}$ is being inputted (S22: Yes), the stop determination unit 4162a determines that the control of the respective actuators is to be stopped, advances to S24, and outputs the degeneration request signal $S_d$.

Thereafter, the routine ends.

In the case where the stop request signal $S_{\_STOP}$ is not being inputted (S22: No), the stop determination unit 4162a advances to S23, where it is determined whether or not the control rejection signal $S_{\_UA}$ is being inputted. The control rejection signal $S_{\_UA}$ is a signal indicating that one or more of the front steering actuator 14, the rear steering actuator 22, and the DYC actuator 32 cannot be controlled based on the yaw rate control amounts due to a malfunction in one or more of the front steering apparatus 10, the rear steering apparatus 20, the braking apparatus 30, and so on. The control rejection signal $S_{UA}$ is, for example, inputted from sensors or the like that monitor the operations of the respective apparatuses (the front steering apparatus 10, the rear steering apparatus 20, and the braking apparatus 30). In the case where the control rejection signal $S_{UA}$ is being inputted (S23: Yes), the stop determination unit 4162a determines that the control of the respective actuators is to be stopped, advances to S24, and outputs the degeneration request signal $S_d$. Thereafter, the routine ends. Meanwhile, in the case where the control rejection signal $S_{UA}$ is not being inputted (S23: No), it is determined that the control of the respective actuators is not to be stopped, and the routine ends. Note that the stop determination unit 4162a repeatedly executes this routine when the degeneration request signal $S_d$ is not being outputted.

As can be seen from the foregoing descriptions, the stop determination unit 4162a determines that the control of the respective actuators is to be stopped in the case where the override determination flag F is set to 1, the case where the stop request signal $S_{STOP}$ is being inputted, and the case where the control rejection signal $S_{UA}$ is being inputted. The degeneration request signal $S_d$ is then outputted. The degeneration request signal $S_d$ outputted from the stop determination unit 4162a is inputted into the final value calculation unit 4161 and the degeneration control amount determination unit 4162b. In the case where the degeneration request signal $S_d$ has been inputted, the final value calculation unit 4161 stops the output of the respective yaw rate control amounts and the respective actuation request signals to the respective conversion units 42, 43, and 44.

The degeneration control amount determination unit 4162b takes the degeneration request signal $S_d$ from the stop determination unit 4162a as its input, as described above. Furthermore, the respective yaw rate control amounts ($\gamma_{\_FSTR}$, $\gamma_{\_RSTR}$, and $\gamma_{\_DYC}$) from the final value calculation unit 4161 and the steering torque TS from the torque sensor attached to the vehicle are taken as inputs as well. After the degeneration request signal $S_d$ has been inputted, a front steering yaw rate degeneration control amount $\gamma_{d\_FSTR}$, a rear steering yaw rate degeneration control amount $\gamma_{d\_RSTR}$, and a DYC yaw rate degeneration control amount $\gamma_{d\_DYC}$ are calculated. Furthermore, the calculated front steering yaw rate degeneration control amount $\gamma_{d\_FSTR}$ is outputted to the front-wheel steering angle conversion unit 42, the calculated rear steering yaw rate degeneration control amount $\gamma_{d\_RSTR}$ is outputted to the rear-wheel steering conversion unit 43, and the calculated DYC yaw rate degeneration control amount $\gamma_{d\_DYC}$ is outputted to the DYC axle torque conversion unit 44.

In this case, the front-wheel steering angle conversion unit 42 calculates the front wheel target steering angle $\delta f^*$ based on the inputted front steering yaw rate degeneration control amount $\gamma_{d\_FSTR}$. The signal indicating the calculated front wheel target steering angle $\delta f^*$ is then outputted to the front steering actuator 14. The front steering actuator 14 actuates so that the front wheel steering angle $\delta f$ matches the front wheel target steering angle $\delta f^*$. The rear-wheel steering conversion unit 43 calculates a rear wheel target steering angle $\delta r^*$ based on the inputted rear steering yaw rate degeneration control amount $\gamma_{d\_RSTR}$. The signal indicating the calculated rear wheel target steering angle $\delta r^*$ is then outputted to the rear steering actuator 22. The rear steering actuator 22 actuates so that the rear wheel steering angle $\delta r$ matches the rear wheel target steering angle $\delta r^*$. The DYC axle torque conversion unit 44 calculates the target DYC torque Tb* based on the inputted DYC yaw rate degeneration control amount $\gamma_{d\_DYC}$. The signal indicating the calculated target DYC torque Tb* is outputted to the DYC actuator 32 that is to be actuated. The DYC actuator 32 into which the target DYC torque Tb* has been inputted then operates so that the axle torque Tb acting on the corresponding wheel matches the target DYC torque Tb*. In this manner, after the degeneration request signal $S_d$ has been outputted by the stop determination unit 4162a, the respective conversion units 42, 43, and 44 control the actuations of the respective actuators based on the respective yaw rate degeneration control amounts $\gamma_{d\_*}$ (where * indicates FSTR, RSTR, or DYC) determined (calculated) by the degeneration control amount determination unit 4162b. Through this, degeneration control is carried out on the respective actuators.

Figure 7:
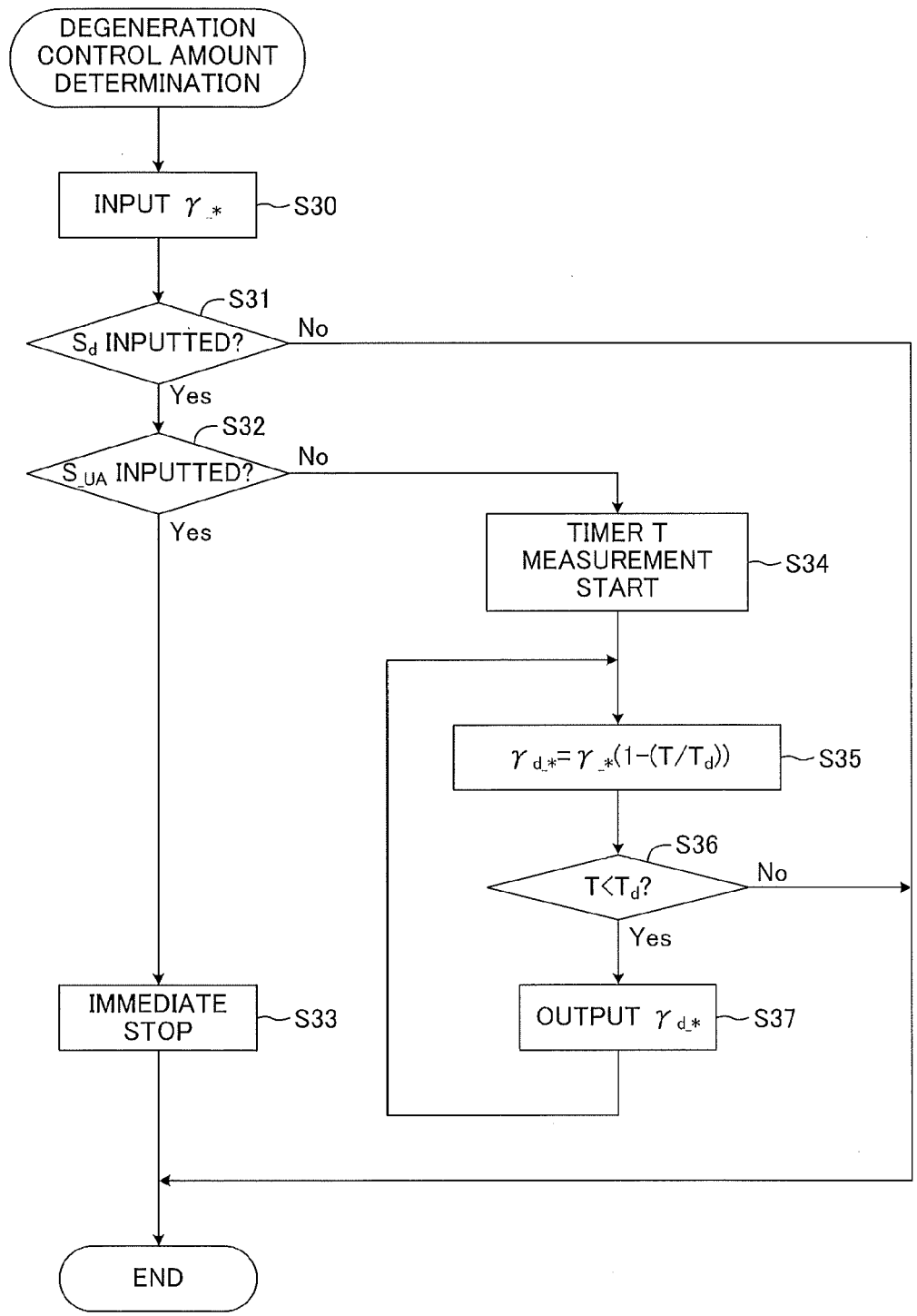
FIG. 7 is a flowchart illustrating a degeneration control amount determination routine executed by a degeneration control amount determination unit according to the first embodiment in order to calculate a degeneration control amount.

FIG. 7 is a flowchart illustrating a degeneration control amount determination routine executed by the degeneration control amount determination unit 4162b in order to calculate the yaw rate degeneration control amounts $\gamma_{d\_*}$. This routine launches when the lateral motion control is started by the lateral motion control apparatus 40. When the routine launches, in S30 of FIG. 7, the degeneration control amount determination unit 4162b takes the yaw rate control amounts $\gamma_{\_*}$ of the respective actuators as its inputs. Next, it is determined whether or not the degeneration request signal $S_d$ is being inputted (S31). The routine ends in the case where the degeneration request signal $S_d$ is not being inputted (S31: No). Note that in the case where the degeneration request signal $S_d$ is not being inputted, the present routine is repeatedly executed until the degeneration request signal $S_d$ is inputted.

Meanwhile, in the case where the degeneration request signal $S_d$ is being inputted (S31: Yes), the degeneration control amount determination unit 4162b advances to S32, where it is determined whether or not the control rejection signal $S_{UA}$ is being inputted into the stop determination unit 4162a. In the case where the control rejection signal is not being inputted into the stop determination unit 4162a (S32: No), the degeneration control amount determination unit 4162b advances to S34, where a timer begins to measure time. Next, the respective yaw rate degeneration control amounts $\gamma_{d\_*}$ (where * is any of FSTR, RSTR, or DYC) are calculated based on the following equation (S35).

$$\gamma_{d\_*} = \gamma_{\_*}(1-(T/T_d))$$

In the above equation, $\gamma_{\_*}$ (where * is any of FSTR, RSTR, or DYC) indicates the respective yaw rate control amounts inputted in S30 when the degeneration request signal $S_d$ is being inputted. T is the time measured by the timer, and $T_d$ is a pre-set degeneration time. The degeneration time $T_d$ represents the time for which the respective actuators are controlled based on the yaw rate degeneration control amounts $\gamma_{d\_*}$. The degeneration time $T_d$ is set in advance. The degeneration time $T_d$ is set to no more than 10 seconds. Preferably, the degeneration time $T_d$ is set to a time between 1 and 10 seconds. Meanwhile, in the present embodiment, the degeneration time used in the calculation of the front steering yaw rate degeneration control amount $\gamma_{d\_FSTR}$, the degeneration time used in the calculation of the rear steering yaw rate degeneration control amount $\gamma_{d\_RSTR}$, and the degeneration time used in the calculation of the DYC yaw rate degeneration control amount $\gamma_{d\_DYC}$ are all the same.

According to the above equation, when T=0, the yaw rate degeneration control amount $\gamma_{d\_*}$ is equal to the yaw rate control amount $\gamma_{\_*}$. Meanwhile, when $T=T_d$, the yaw rate degeneration control amount $\gamma_{d\_*}$ is 0. Furthermore, during the period in which $0<T<T_d$, the yaw rate degeneration control amount $\gamma_{d\_*}$ decreases linearly as T increases.

After the yaw rate degeneration control amount $\gamma_{d\_*}$ has been calculated in S35, the degeneration control amount determination unit 4162b advances to S36, where it is determined whether or not the time T measured by the timer is less than the degeneration time $T_d$. In the case where the measured time T is less than the degeneration time $T_d$ (S36: Yes), the process advances to S37, where a signal indicating the yaw rate degeneration control amount $\gamma_{d\_*}$ is outputted. Then, the process returns to S35, where the yaw rate degeneration control amount $\gamma_{d\_*}$ is once again calculated; then, in the case where the determination result in S36 is Yes, the signal indicating the yaw rate degeneration control amount $\gamma_{d\_*}$ is outputted (S37). By repeating S35 through S37, the signal indicating the yaw rate degeneration control amount $\gamma_{d\_*}$ calculated in S35 is outputted until the measured time T reaches the degeneration time $T_d$. The respective actuators are then controlled based on the outputted signals indicating the yaw rate degeneration control amount $\gamma_{d\_*}$.

In the case where, in S36, it is determined that the time T measured by the timer is not less than the degeneration time $T_d$ (S36: No), or in other words, in the case where the measured time T has reached the degeneration time $T_d$, the degeneration control amount determination unit 4162b ends the present routine.

Figure 8:
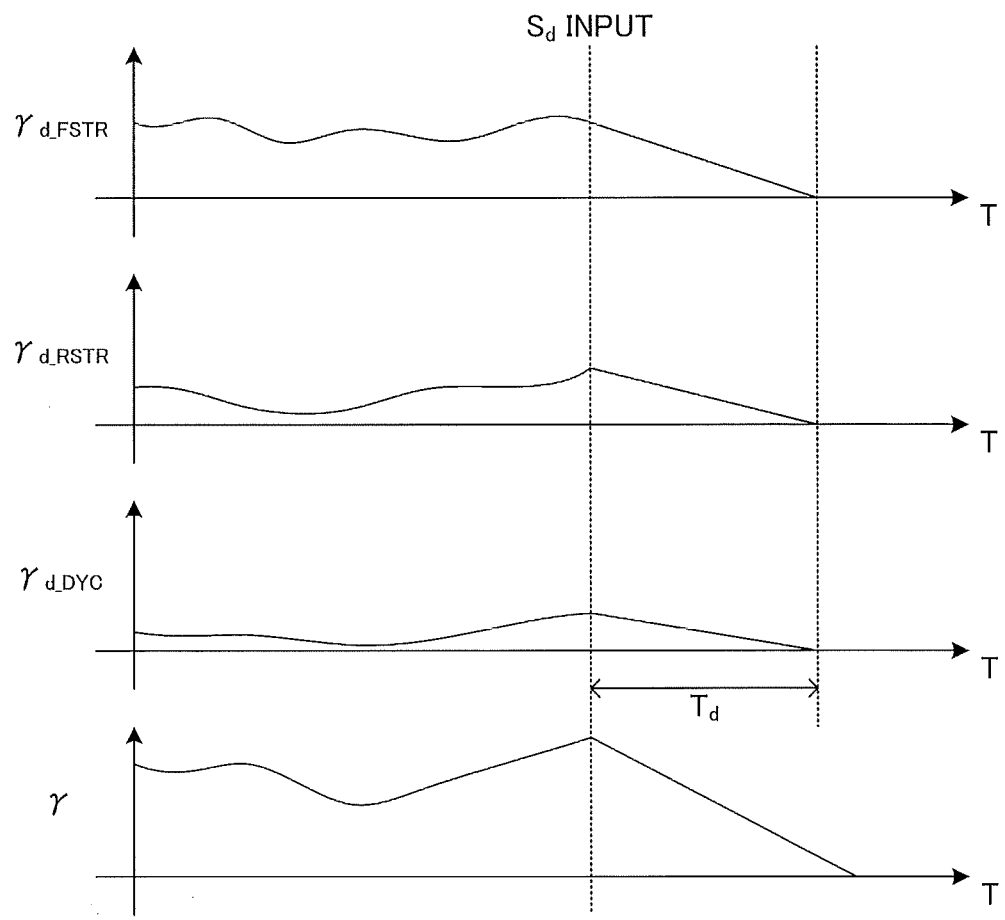
FIG. 8 is a diagram illustrating yaw rate degeneration control amounts and changes in the yaw rate of a vehicle when degeneration control according to the first embodiment is executed.

FIG. 8 is a diagram illustrating the yaw rate degeneration control amount $\gamma_{d\_*}$ and changes in the yaw rate y of the vehicle when degeneration control according to the present embodiment is executed. In FIG. 8, the horizontal axis represents time, whereas the vertical axis represents the yaw rate degeneration control amount $\gamma_{d\_*}$ or the yaw rate y of the vehicle.

As shown in FIG. 8, degeneration control is commenced for the respective yaw rate control amounts when the degeneration request signal $S_d$ is inputted. Then, after the degeneration request signal $S_d$ is inputted, all of the yaw rate degeneration control amounts $\gamma_{d\_*}$ decrease. In response to this, the yaw rate of the vehicle also gradually decreases. Then, when the degeneration time $T_d$ has passed after the input of the degeneration request signal $S_d$, all of the yaw rate degeneration control amounts $\gamma_{d\_*}$ go to 0 at the same time. By causing the control amounts of the respective actuators to gradually decrease using degeneration control in this manner, it is possible to stabilize the behavior of the vehicle when the lateral motion of the vehicle is stopped by the lateral motion control apparatus 40, and thus a sense of discomfort imparted upon the driver can be reduced.

Furthermore, the control of the respective actuators is stopped at the same time (that is, the yaw rate control amounts of the respective actuators are set to 0 at the same time), and is also possible to reduce a sense of discomfort arising due to a certain single actuator being controlled alone. Furthermore, in the present embodiment, the degeneration time $T_d$ is set to no more than 10 seconds. In other words, the degeneration time $T_d$ is set to a length that is several tens of times (for example, 50 times) a response speed that can be sensed by humans (for example, several Hz). Accordingly, it is possible to degenerate the control amounts of the respective actuators without imparting a sense of discomfort, but while also imparting upon the driver a sense that degeneration control is being carried out.

In the case where it has been determined in S32 of FIG. 7 that the control rejection signal $S_{\_UA}$ is being inputted to the stop determination unit 4162a (S32: Yes), the degeneration control amount determination unit 4162b advances to S33, where an immediate stop process is executed. The control of the respective actuators is immediately stopped as a result of this immediate stop process. In other words, the yaw rate control amount $\gamma_{d\_*}$ of each actuator is immediately set to 0. After this, the degeneration control amount determination unit ends the present routine.

Figure 9:
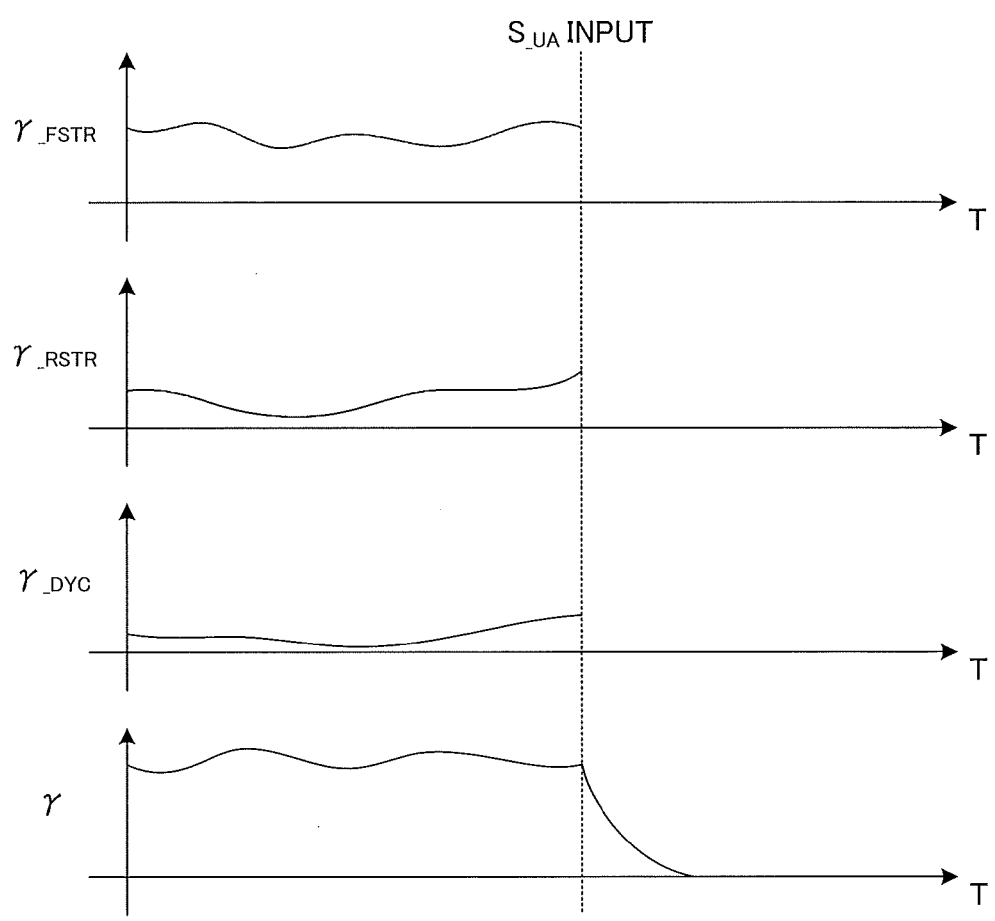
FIG. 9 is a graph illustrating individual yaw rate control amounts and changes in the yaw rate of a vehicle in the case where a control rejection signal has been inputted into a stop determination unit.

FIG. 9 is a graph illustrating the yaw rate control amounts $\gamma_{d\_*}$ and changes in the yaw rate y of the vehicle in the case where the control rejection signal $S_{\_UA}$ has been inputted into the stop determination unit 4162a. In FIG. 9, the horizontal axis represents time, whereas the vertical axis represents the yaw rate control amounts or the yaw rate y of the vehicle. As shown in FIG. 9, when the control rejection signal $S_{\_UA}$ has been inputted into the stop determination unit 4162a, the yaw rate control amounts of the respective actuators are immediately set to 0. As a result, the yaw rate y of the vehicle quickly drops, eventually reaching 0 (or the yaw rate of the vehicle oscillates and eventually reaches 0 as a result of the oscillation being dampened).

In the case where the control rejection signal $S_{\_UA}$ is being inputted into the stop determination unit 4162a, the control of at least one of the plurality of actuators cannot be carried out. Even if a yaw rate degeneration control amount has been determined in S35 for the actuator that cannot be controlled, the actuator cannot be controlled in accordance with the determined yaw rate degeneration control amount. Furthermore, there is a risk that the stability of travel of the vehicle will be degraded by the actuator that cannot be controlled operating. Accordingly, in the present embodiment, the control of all of the actuators is immediately stopped in such a case. Although immediately stopping the control of all of the actuators will impart a sense of discomfort on the driver, it is possible to prevent degradation in the stability of travel due to actuators that cannot be controlled operating.

(Second Embodiment)

The above first embodiment describes an example in which the yaw rate degeneration control amounts for the respective actuators are determined so that the control of the respective actuators stops at the same time during degeneration control. The present embodiment, on the other hand, describes an example in which the yaw rate degeneration control amounts for the respective actuators are determined so that the degeneration velocities of the respective actuators are the same during degeneration control. Note that the configuration of the lateral motion control apparatus 40 according to the present embodiment is the same as the configuration described in the above first embodiment, except for the degeneration control amount determination routine executed by the degeneration control amount determination unit 4162b, which will be described hereinafter. Therefore, descriptions will be omitted for elements that are the same as in the configuration described in the above first embodiment.

Figure 10:
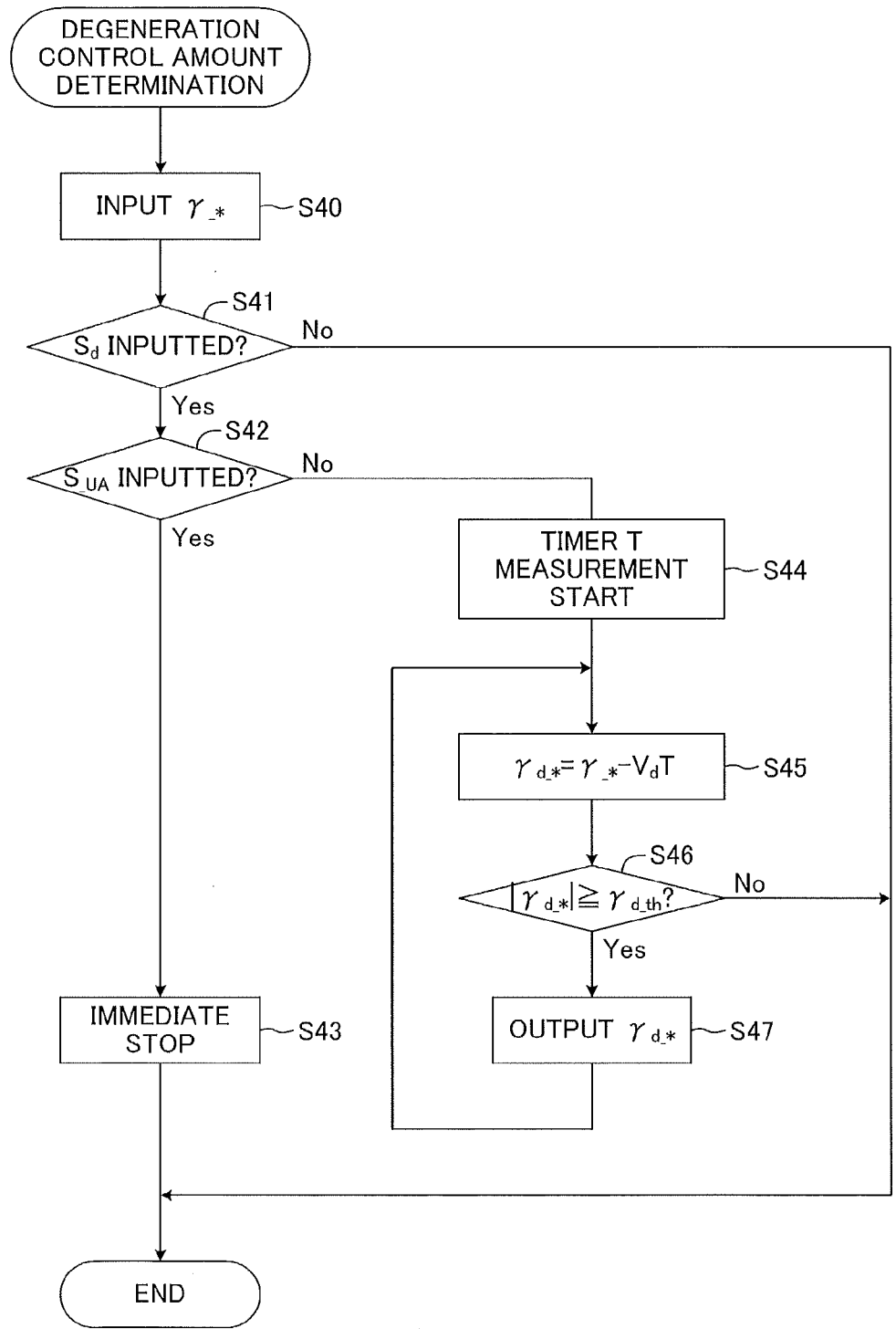
FIG. 10 is a flowchart illustrating a degeneration control amount determination routine executed by a degeneration control amount determination unit according to a second embodiment in order to calculate a degeneration control amount.

FIG. 10 is a flowchart illustrating a degeneration control amount determination routine executed by the degeneration control amount determination unit 4162b according to the present embodiment in order to calculate the yaw rate degeneration control amounts $\gamma_{d\_*}$ This routine is launched when the lateral motion control is started by the lateral motion control apparatus 40. When this routine is launched, in S40 of FIG. 10, the degeneration control amount determination unit 4162b takes the yaw rate control amounts $\gamma_{d\_*}$ of the respective actuators as its inputs. Next, it is determined whether or not the degeneration request signal $S_d$ is being inputted, or in other words, whether or not the stop determination unit 4162a has determined that the control of the respective actuators is to be stopped (S41). The routine ends in the case where the degeneration request signal $S_d$ is not being inputted (S41: No). Note that in the case where the degeneration request signal $S_d$ is not being inputted, the present routine is repeatedly executed until the degeneration request signal $S_d$ is inputted.

Meanwhile, in the case where the degeneration request signal $S_d$ is being inputted (S41: Yes), or in other words, the case where the stop determination unit 4162a has determined that the control of the respective actuators is to be stopped, the degeneration control amount determination unit 4162b advances to S42, where it is determined whether or not the control rejection signal $S_{\_UA}$ is being inputted into the stop determination unit 4162a. In the case where the control rejection signal $S_{\_UA}$ is being inputted into the stop determination unit 4162a (S42: Yes), the degeneration control amount determination unit 4162b advances to S43, where an immediate stop process is executed. The control of the respective actuators is immediately stopped as a result of this immediate stop process. After this, the degeneration control amount determination unit 4162b ends the present routine.

Meanwhile, in the case where the control rejection signal $S_{\_UA}$ is not being inputted into the stop determination unit 4162a (S42: No), the degeneration control amount determination unit 4162b advances to S44, where a timer begins to measure time. Next, the respective yaw rate degeneration control amounts $\gamma_{d\_*}$ are calculated based on the following equation (S45).

$$\gamma_{d\_*} = \gamma_{d\_*} - V_d T$$

In the above equation, $\gamma_{d\_*}$ indicates the respective yaw rate control amounts inputted in S40 when the degeneration request signal $S_d$ has been inputted. T is the time measured by the timer, and $V_d$ is a pre-set degeneration speed (yaw rate/second). The degeneration speed $V_d$ represents the change amount (amount of decrease) in the yaw rate control amount per unit of time. Here, the degeneration speed used in the calculation of the front steering yaw rate degeneration control amount $\gamma_{d\_FSTR}$, the degeneration speed used in the calculation of the rear steering yaw rate degeneration control amount $\gamma_{d\_RSTR}$, and the degeneration speed used in the calculation of the DYC yaw rate degeneration control amount $\gamma_{d\_DYC}$ are all the same. Note that the above equation is used when the yaw rate control amount $\gamma_{\_*}$ is a positive value. When the yaw rate control amount $\gamma_{\_*}$ is a negative value, the yaw rate degeneration control amounts $\gamma_{d\_*}$ may be calculated based on the following equation.

$$\gamma_{d\_*} = \gamma_{\_*} - V_d T$$

Next, the degeneration control amount determination unit 4162b determines whether or not the magnitudes of the calculated yaw rate degeneration control amounts $\gamma_{d\_*}$ are greater than or equal to a minute value $\gamma_{d\_th}$ that is close to 0 (S46). In the case where the magnitude of the calculated yaw rate degeneration control amount $\gamma_{d\_*}$ is greater than or equal to the minute value $\gamma_{d\_th}$ that is close to 0 (S46: Yes), the degeneration control amount determination unit 4162b advances to S47 and outputs the yaw rate degeneration control amount $\gamma_{d\_*}$ calculated in S45. After this, the process returns to S45, where the yaw rate degeneration control amount $\gamma_{d\_*}$ is calculated once again (S45); it is then determined whether or not the magnitude of the calculated yaw rate degeneration control amount $\gamma_{d\_*}$ is greater than or equal to the minute value $\gamma_{d\_th}$ that is close to 0 (S46), and if the control amount is greater than or equal to the minute value $\gamma_{d\_th}$ that is close to 0, the yaw rate degeneration control amount $\gamma_{d\_*}$ is outputted (S47). By repeating S45 through S47, the yaw rate degeneration control amount $\gamma_{d\_*}$ calculated in S45 is outputted until the magnitude of the yaw rate degeneration control amount $\gamma_{d\_*}$ becomes less than the minute value $\gamma_{d\_th}$ that is close to 0.

In the case where it has been determined in S46 that the magnitude of the yaw rate degeneration control amount $\gamma_{d\_*}$ has become less than the minute value $\gamma_{d\_th}$ that is close to 0 (S46: No), the degeneration control amount determination unit 4162b ends the present routine. By executing the degeneration control amount determination routine as described thus far, the respective actuators are controlled based on the yaw rate degeneration control amounts $\gamma_{d\_*}$ whose magnitudes gradually decrease during degeneration control. The lateral motion control performed by the lateral motion control apparatus is then stopped at the time when the magnitude of the yaw rate degeneration control amounts $\gamma_{d\_*}$ of the respective actuators reaches 0. In this manner, by gradually reducing the yaw rate control amounts of the respective actuators through the degeneration control, a sense of discomfort imparted upon the driver when the lateral motion control is stopped can be reduced.

Figure 11:
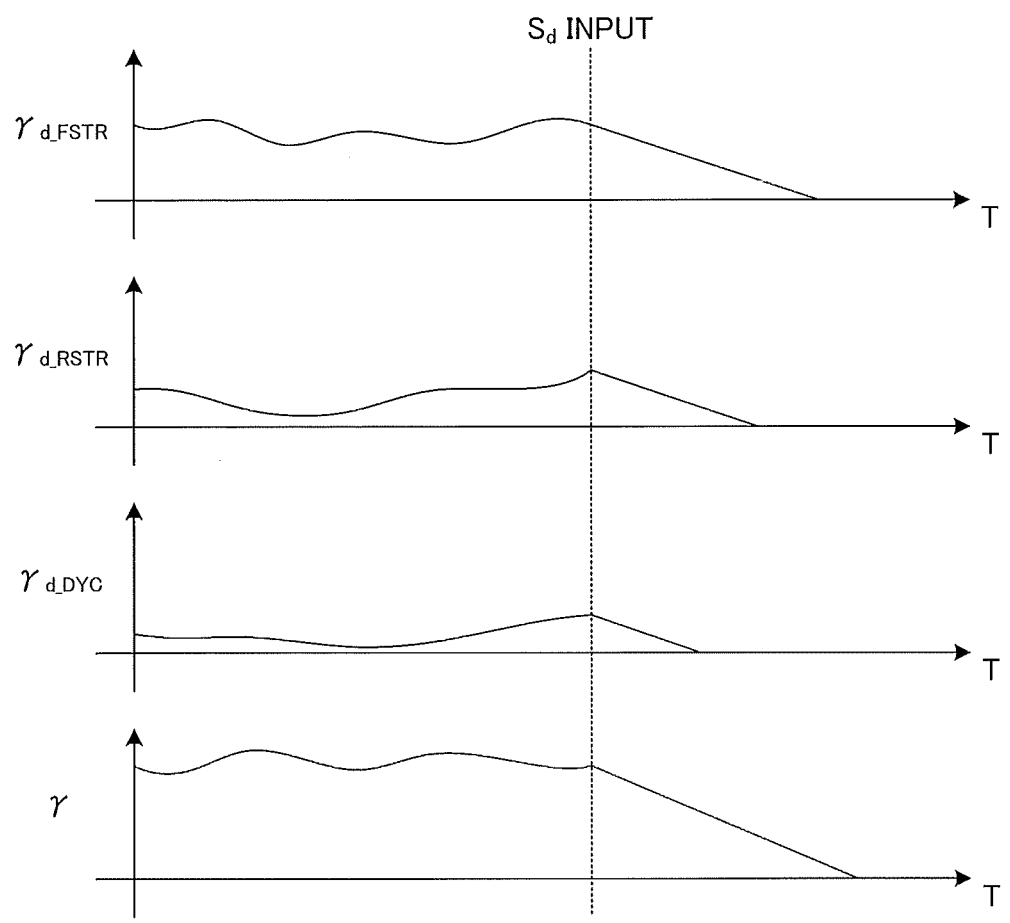
FIG. 11 is a diagram illustrating yaw rate degeneration control amounts and changes in the yaw rate of a vehicle when degeneration control according to the second embodiment is executed.

FIG. 11 is a diagram illustrating the yaw rate degeneration control amount $\gamma_{d\_*}$ and changes in the yaw rate y of the vehicle when degeneration control according to the present embodiment is executed. In FIG. 11, the horizontal axis represents time, whereas the vertical axis represents the yaw rate degeneration control amount $\gamma_{d\_*}$ or the yaw rate y of the vehicle.

As shown in FIG. 11, degeneration control is commenced for the respective yaw rate control amounts when the degeneration request signal $S_d$ is inputted. After the degeneration request signal $S_d$ is inputted, all of the yaw rate degeneration control amounts $\gamma_{d\_*}$ decrease. In this case, the degeneration speeds $V_d$ for all of the yaw rate degeneration control amounts (that is, the front steering yaw rate degeneration control amount $\gamma_{d\_FSTR}$, the rear steering yaw rate degeneration control amount $\gamma_{d\_RSTR}$, and the DYC yaw rate degeneration control amount $\gamma_{d\_DYC}$) are the same. Accordingly, the control is stopped in order from the actuator whose yaw rate control amount is the lowest when the degeneration control is started. Note that in the present embodiment, the degeneration speed $V_d$ is set so that the degeneration time for the actuator whose control is stopped last is less than 10 seconds. In this manner, by setting the degeneration speeds of the yaw rate degeneration control amounts to be the same for all of the actuators, it is possible to reduce a sense of discomfort due to the degeneration speeds of the yaw rate degeneration control amounts differing among the respective actuators.

(Third Embodiment)

Next, a third embodiment of the present invention will be described. The present embodiment describes an example in which the degeneration control amounts are determined for the respective actuators so that the control of the actuators is stopped in order from the actuator that has the least amount of effect on the turning behavior of the vehicle. Note that the configuration of the lateral motion control apparatus 40 according to the present embodiment is the same as the configuration described in the above first embodiment, except for the degeneration control amount determination routine executed by the degeneration control amount determination unit 4162b, which will be described hereinafter. Therefore, descriptions will be omitted for elements that are the same as in the configuration described in the above first embodiment.

Figure 12:
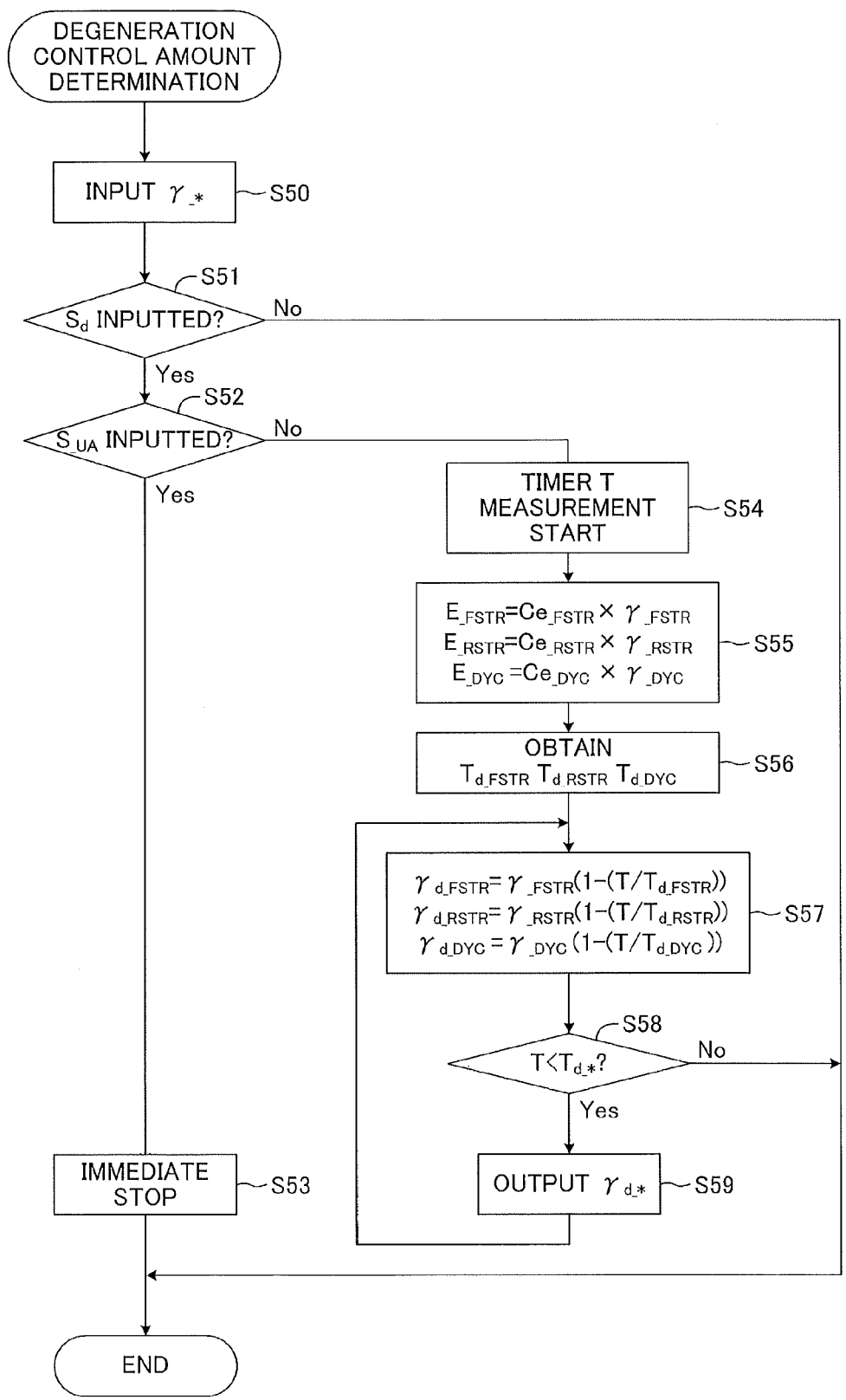
FIG. 12 is a flowchart illustrating a degeneration control amount determination routine executed by a degeneration control amount determination unit according to a third embodiment in order to calculate a yaw rate degeneration control amount.

FIG. 12 is a flowchart illustrating a degeneration control amount determination routine executed by the degeneration control amount determination unit 4162b according to the present embodiment in order to calculate the yaw rate degeneration control amounts $\gamma_{d\_*}$. When this routine is launched, in S50 of FIG. 12, the degeneration control amount determination unit 4162b takes the yaw rate control amounts γ_* of the respective actuators as its inputs. Next, it is determined whether or not the degeneration request signal $S_d$ is being inputted, or in other words, whether or not the stop determination unit 4162a has determined that the control of the respective actuators is to be stopped (S51). The routine ends in the case where the degeneration request signal $S_d$ is not being inputted (S51: No). Note that in the case where the degeneration request signal $S_d$ is not being inputted, the present routine is repeatedly executed until the degeneration request signal $S_d$ is inputted.

Meanwhile, in the case where the degeneration request signal $S_d$ is being inputted (S51: Yes), or in other words, in the case where the stop determination unit 4162a has determined that the control of the respective actuators is to be stopped, the degeneration control amount determination unit 4162b advances to S52, where it is determined whether or not the control rejection signal $S_{UA}$ is being inputted into the stop determination unit 4162a. In the case where the control rejection signal $S_{UA}$ is being inputted into the stop determination unit 4162a (S52: Yes), the degeneration control amount determination unit 4162b advances to S53, where an immediate stop process is executed. The control of the respective actuators is immediately stopped as a result of this immediate stop process. After this, the degeneration control amount determination unit ends the present routine.

Meanwhile, in the case where the control rejection signal $S_{UA}$ is not being inputted into the stop determination unit 4162a (S52: No), the degeneration control amount determination unit 4162b advances to S54, where a timer begins to measure time. Next, a front steering effect index $E_{FSTR}$, a rear steering effect index $E_{RSTR}$, and a DYC effect index $E_{DYC}$ are calculated. The front steering effect index $E_{FSTR}$ is a numerical value representing the magnitude of the effect of the degeneration control on the turning behavior of the vehicle in the case where the front steering yaw rate control amount $\gamma_{FSTR}$, inputted in S50 when the degeneration request signal $S_d$ has been inputted, changes to 0, or in other words, in the case where degeneration control has been carried out on the front steering actuator 14. The rear steering effect index $E_{RSTR}$ is a numerical value representing the magnitude of the effect of the degeneration control on the turning behavior of the vehicle in the case where the rear steering yaw rate control amount $\gamma_{RSTR}$, inputted in S50 when the degeneration request signal $S_d$ has been inputted, changes to 0, or in other words, in the case where degeneration control has been carried out on the rear steering actuator 22. The DYC effect index $E_{DYC}$ is a numerical value representing the magnitude of the effect of the degeneration control on the turning behavior of the vehicle in the case where the DYC yaw rate control amount $\gamma_{DYC}$, inputted in S50 when the degeneration request signal $S_d$ has been inputted, changes to 0, or in other words, in the case where degeneration control has been carried out on the DYC actuator 32.

The front steering effect index $E_{FSTR}$ is found by multiplying the front steering yaw rate control amount $\gamma_{FSTR}$ inputted in S50 when the degeneration request signal $S_d$ has been inputted, by a front steering effect coefficient $Ce_{FSTR}$. The rear steering effect index $E_{RSTR}$ is found by multiplying the rear steering yaw rate control amount $\gamma_{RSTR}$, inputted in S50 when the degeneration request signal $S_d$ has been inputted, by a rear steering effect coefficient $Ce_{RSTR}$. The DYC effect index $E_{DYC}$ is found by multiplying the DYC yaw rate control amount $\gamma_{DYC}$ inputted in S50 when the degeneration request signal $S_d$ has been inputted, by a DYC effect coefficient $Ce_{DYC}$.

The front steering effect coefficient $Ce_{FSTR}$ is a coefficient representing the magnitude of the effect that operation of the front steering actuator 14 has on the turning behavior of the vehicle. The rear steering effect coefficient $Ce_{RSTR}$ is a coefficient representing the magnitude of the effect that the operation of the rear steering actuator 22 has on the turning behavior of the vehicle. The DYC effect coefficient $Ce_{DYC}$ is a coefficient representing the magnitude of the effect that the operation of the DYC actuator 32 has on the turning behavior of the vehicle. These effect coefficients are investigated in advance and are stored in the degeneration control amount determination unit 4162b. In general, the magnitude relationship of these effect coefficients is represented as follows.

$$Ce_{FSTR} > Ce_{DYC} > Ce_{RSTR}$$

After the respective effect indexes have been calculated in S55, the degeneration control amount determination unit 4162b obtains, in S56, a front steering yaw rate degeneration time $T_{d\_FSTR}$, a rear steering yaw rate degeneration time $T_{d\_RSTR}$, and a DYC yaw rate degeneration time $T_{d\_DYC}$. An effect index-degeneration time table is referred to when obtaining the respective degeneration times.

Figure 13:
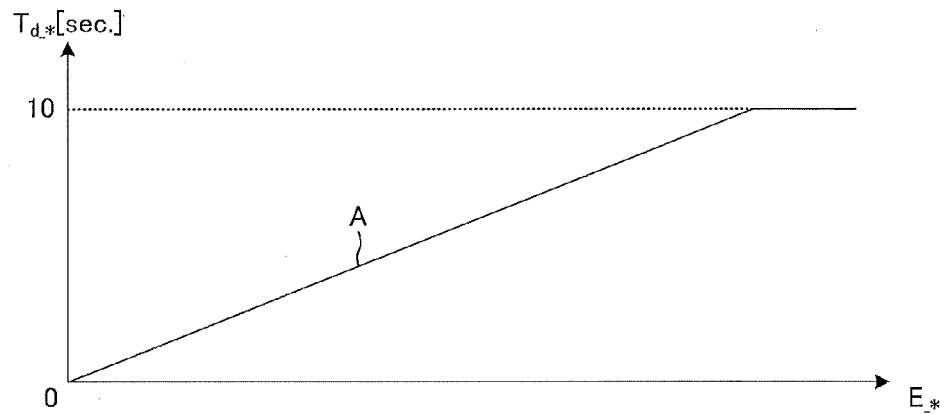
FIG. 13 is a diagram representing an example of an effect index-degeneration time map as a graph.

FIG. 13 is a diagram representing an example of an effect index-degeneration time table as a graph. The horizontal axis in FIG. 13 represents an effect index $E_*$ (where * is any of FSTR, RSTR, or DYC), whereas the vertical axis represents the degeneration time $T_{d\_*}$ (where * is any of FSTR, RSTR, or DYC). The degeneration times $T_{d\_*}$ that correspond to the respective effect indexes $E_*$ are indicated by the line A in FIG. 13. As can be seen in FIG. 13, the greater the effect index $E_*$ is, the longer the degeneration time $T_{d\_*}$ corresponding to that effect index $E_*$ becomes. The maximum value of the degeneration time $T_{d\_*}$ is 10 seconds. The degeneration control amount determination unit 4162b obtains the respective degeneration times $T_{d\_*}$ by referring to the effect index-degeneration time table and extracting the degeneration times $T_{d\_*}$ corresponding to the effect indexes $E_*$ found in S55.

Next, in S57, the degeneration control amount determination unit 4162b calculates the front steering yaw rate degeneration control amount $\gamma_{d\_FSTR}$, the rear steering yaw rate degeneration control amount $\gamma_{d\_RSTR}$, and the DYC yaw rate degeneration control amount $\gamma_{d\_DYC}$. In the present embodiment, the respective yaw rate degeneration control amounts $\gamma_{d\_*}$ are calculated based on the following equations.

$$\gamma_{d\_FSTR} = \gamma_{FSTR}(1-(T/T_{d\_FSTR}))$$

$$\gamma_{d\_RSTR} = \gamma_{RSTR}(1-(T/T_{d\_RSTR}))$$

$$\gamma_{d\_DYC} = \gamma_{DYC}(1-(T/T_{d\_DYC}))$$

In the above equation, (where * is any of FSTR, RSTR, or DYC) indicates the respective yaw rate control amounts inputted in S50 when the degeneration request signal $S_d$ is being inputted. T indicates a time measured by a timer.

After the yaw rate degeneration control amount $\gamma_{d\_*}$ has been calculated in S57, the degeneration control amount determination unit 4162b advances to S58, where it is determined whether or not the time T measured by the timer is less than the degeneration time $T_d$. In the case where the measured time T is less than the degeneration time $T_d$ (S58: Yes), the process advances to S59, where the yaw rate degeneration control amount $\gamma_{d\_*}$ is outputted. Then, the process returns to S57, where the yaw rate degeneration control amount $\gamma_{d\_*}$ is once again calculated; then, in the case where the determination result in S58 is Yes, the yaw rate degeneration control amount $\gamma_{d\_*}$ is outputted (S59). By repeating S57 through S59, the yaw rate degeneration control amount $\gamma_{d\_*}$ calculated in S57 is outputted until the measured time T reaches the degeneration time $T_d$. Degeneration control is then carried out for the respective actuators based on the outputted yaw rate degeneration control amount $\gamma_{d\_*}$.

In the case where, in S58, it is determined that the time T measured by the timer is not less than the degeneration time $T_d$ (S58: No), or in other words, in the case where the measured time T has reached the degeneration time $T_d$, the degeneration control amount determination unit 4162b ends the present routine. By executing the degeneration control amount determination routine as described thus far, the respective actuators are controlled based on the yaw rate degeneration control amounts $\gamma_{d\_*}$, which is gradually reduced during degeneration control. The lateral motion control performed by the lateral motion control apparatus is then stopped at the time when the magnitude of the yaw rate degeneration control amounts $\gamma_{d\_*}$ of the respective actuators reaches 0. In this manner, by gradually reducing the yaw rate control amounts of the respective actuators through the degeneration control, a sense of discomfort imparted upon the driver when the lateral motion control is stopped can be reduced.

Figure 14:
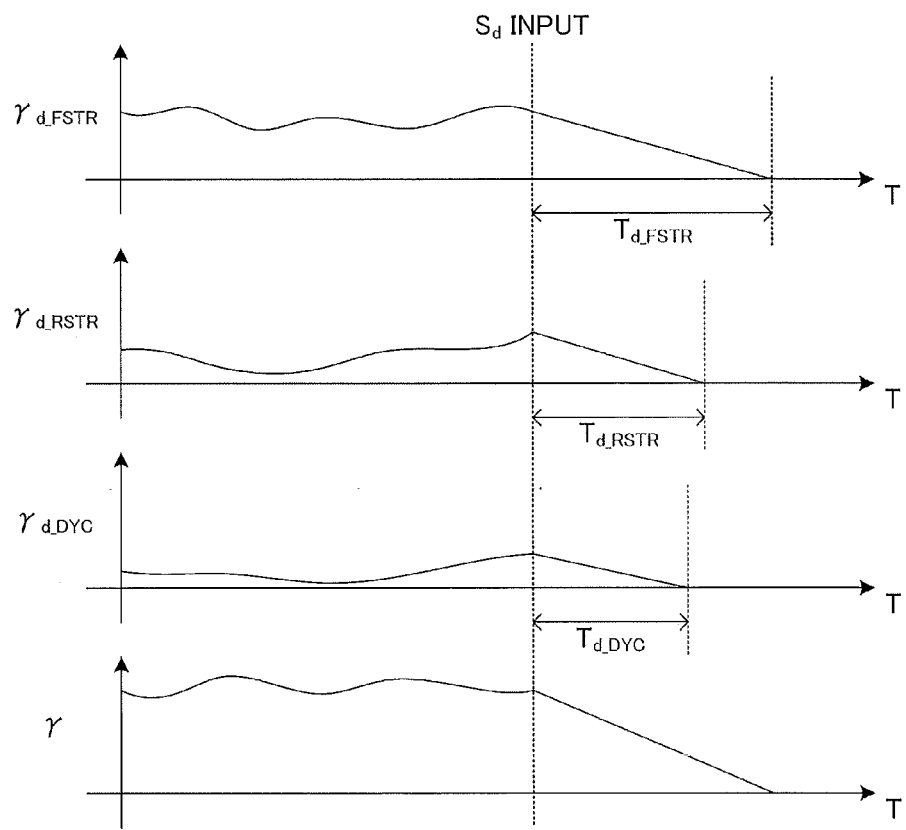
FIG. 14 is a diagram illustrating yaw rate degeneration control amounts and changes in the yaw rate of a vehicle when degeneration control according to the third embodiment is executed.

FIG. 14 is a diagram illustrating the yaw rate degeneration control amount $\gamma_{d\_*}$ and changes in the yaw rate $\gamma$ of the vehicle when degeneration control according to the present embodiment is executed. In FIG. 14, the horizontal axis represents time, whereas the vertical axis represents the yaw rate degeneration control amount $\gamma_{d\_*}$ or the yaw rate y of the vehicle.

As shown in FIG. 14, degeneration control is commenced for the respective yaw rate control amounts when the degeneration request signal $S_d$ is inputted. Then, after the degeneration request signal $S_d$ is inputted, all of the yaw rate degeneration control amounts $\gamma_{d\_*}$ decrease. Meanwhile, the degeneration time for each actuator is set to be longer the greater the effect the degeneration control for that actuator will have on the turning behavior of the vehicle. In FIG. 14, the degeneration time $T_{d\_FSTR}$ for the front steering yaw rate degeneration control amount $\gamma_{d\_FSTR}$, which has the greatest effect on the turning behavior of the vehicle, is set to be the longest; the degeneration time $T_{d\_RSTR}$ for the rear steering yaw rate degeneration control amount $\gamma_{d\_RSTR}$, which has a relatively greater effect, is set to be the second longest; and the degeneration time $T_{d\_DYC}$ for the DYC yaw rate degeneration control amount $\gamma_{d\_DYC}$, which has a relatively less effect, is set to be the shortest. In this manner, it is possible to stabilize the turning behavior of the vehicle at the time of degeneration control, by setting the degeneration time for the yaw rate degeneration control amount that has a greater effect on the turning behavior of the vehicle to be longer and thus gradually degenerating that control. As a result, it is possible to reduce a sense of discomfort due to instabilities in the turning behavior arising during degeneration control.

(Fourth Embodiment)

Next, a fourth embodiment of the present invention will be described. The present embodiment describes an example in which the degeneration control amounts of the respective actuators are determined so that the control of the front steering actuator 14 stops last during degeneration control. Note that the configuration of the lateral motion control apparatus 40 according to the present embodiment is the same as the configuration described in the above first embodiment, except for the degeneration control amount determination routine executed by the degeneration control amount determination unit 4162b, which will be described hereinafter. Therefore, descriptions will be omitted for elements that are the same as the configuration described in the above first embodiment.

Figure 15:
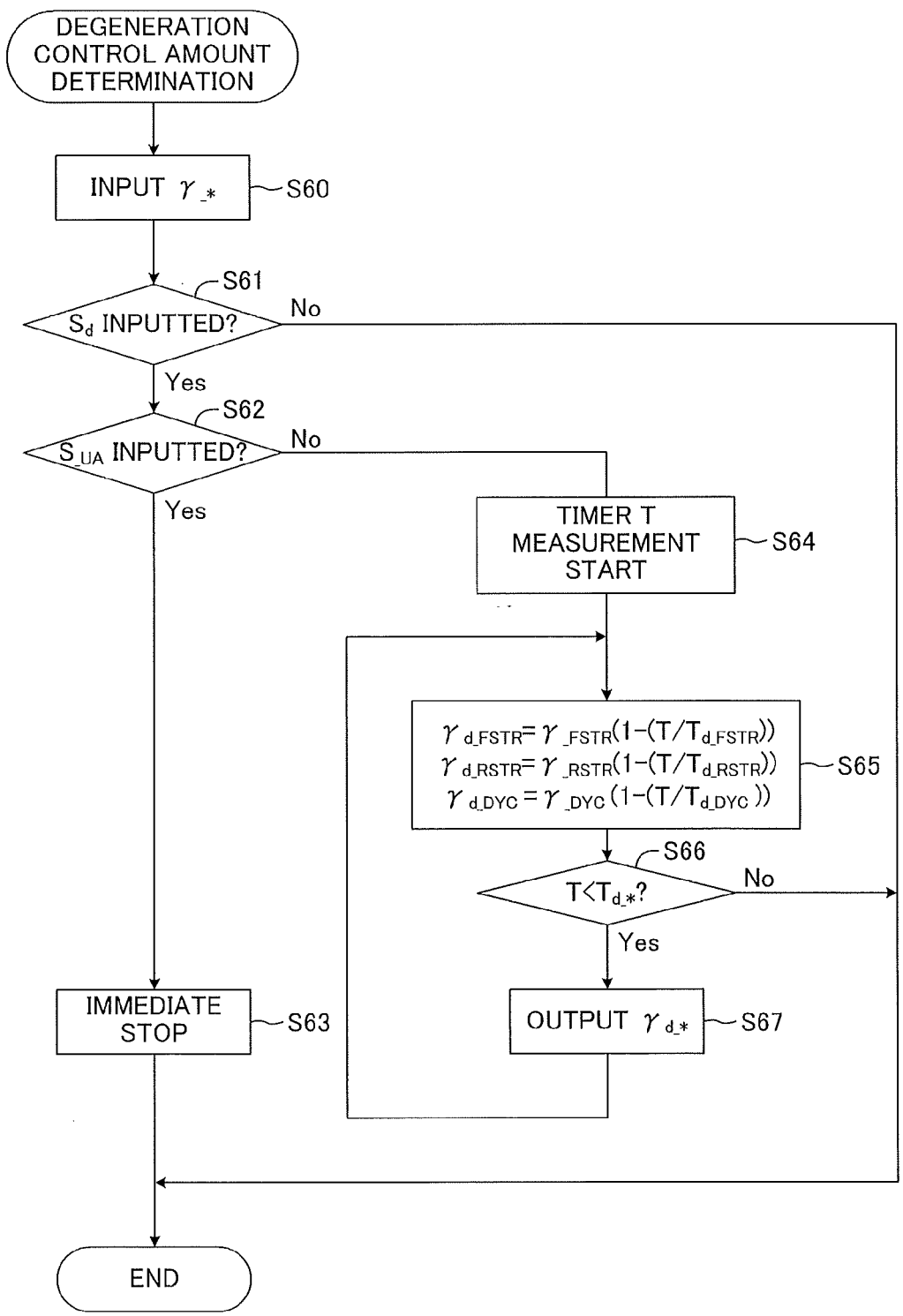
FIG. 15 is a flowchart illustrating a degeneration control amount determination routine executed by a degeneration control amount determination unit according to a fourth embodiment in order to calculate a yaw rate degeneration control amount.

FIG. 15 is a flowchart illustrating a degeneration control amount determination routine executed by the degeneration control amount determination unit 4162b according to the present embodiment in order to calculate the yaw rate degeneration control amounts $\gamma_{d\_*}$. When this routine is launched, in S60 of FIG. 15, the degeneration control amount determination unit 4162b takes the yaw rate control amounts $\gamma_*$ of the respective actuators as its inputs. Next, it is determined whether or not the degeneration request signal $S_d$ is being inputted, or in other words, whether or not the stop determination unit 4162a has determined that the control of the respective actuators is to be stopped (S61). The routine ends in the case where the degeneration request signal $S_d$ is not being inputted (S61: No). Note that in the case where the degeneration request signal $S_d$ is not being inputted, the present routine is repeatedly executed until the degeneration request signal $S_d$ is inputted.

Meanwhile, in the case where the degeneration request signal $S_d$ is being inputted (S61: Yes), or in other words, in the case where the stop determination unit 4162a has determined that the control of the respective actuators is to be stopped, the degeneration control amount determination unit 4162b advances to S62, where it is determined whether or not the control rejection signal $S_{\_UA}$ is being inputted into the stop determination unit 4162a. In the case where the control rejection signal $S_{\_UA}$ is being inputted into the stop determination unit 4162a (S62: Yes), the degeneration control amount determination unit 4162b advances to S63, where an immediate stop process is executed. The control of the respective actuators is immediately stopped as a result of this immediate stop process. After this, the degeneration control amount determination unit ends the present routine.

Meanwhile, in the case where the control rejection signal $S_{\_UA}$ is not being inputted into the stop determination unit 4162a (S62: No), the degeneration control amount determination unit 4162b advances to S64, where a timer begins to measure time. Next, the front steering yaw rate degeneration control amount $\gamma_{d\_FSTR}$, the rear steering yaw rate degeneration control amount $\gamma_{d\_RSTR}$, and the DYC yaw rate degeneration control amount $\gamma_{d\_DYC}$ are calculated through the following equations.

$$\gamma_{d\_FSTR} = \gamma_{\_FSTR}(1-(T-T_{d\_FSTR}))$$

$$\gamma_{d\_RSTR} = \gamma_{\_RSTR}(1-(T-T_{d\_RSTR}))$$

$$\gamma_{d\_DYC} = \gamma_{\_DYC}(1-(T-T_{d\_DYC}))$$

In the above equations, $\gamma_{d\_*}$ (where * is any of FSTR, RSTR, or DYC) indicates the respective yaw rate control amounts inputted in S60 when the degeneration request signal $S_d$ is being inputted. T indicates a time measured by a timer. Furthermore, $T_{d\_FSTR}$ indicates a pre-set front steering yaw rate degeneration time, $T_{d\_RSTR}$ indicates a pre-set rear steering yaw rate degeneration time, and $T_{d\_DYC}$ indicates a pre-set DYC yaw rate degeneration time. These degeneration times represent times for which degeneration control is carried out on the respective actuators. In the present embodiment, the front steering yaw rate degeneration time $T_{d\_FSTR}$ is set to a longer time than the rear steering yaw rate degeneration time $T_{d\_RSTR}$ and the DYC yaw rate degeneration time $T_{d\_DYC}$. Furthermore, the DYC yaw rate degeneration time $T_{d\_DYC}$ is set to a longer time than the rear steering yaw rate degeneration time $T_{d\_RSTR}$. Note, however, that the front steering yaw rate degeneration time $T_{d\_FSTR}$ is less than or equal to 10 seconds.

After the yaw rate degeneration control amount $\gamma_{d\_*}$ has been calculated in S65, the degeneration control amount determination unit 4162*b* advances to S66, where it is determined whether or not the time T measured by the timer is less than the degeneration time $T_{d\_*}$ (where * is any of FSTR, RSTR, or DYC). In the case where the measured time T is less than the degeneration time $T_{d\_*}$ (S66: Yes), the process advances to S67, where the yaw rate degeneration control amount $\gamma_{d\_*}$ is outputted. Then, the process returns to S65, where the yaw rate degeneration control amount $\gamma_{d\_*}$ is once again calculated; then, in the case where the determination result in S66 is Yes, the yaw rate degeneration control amount $\gamma_{d\_*}$ is outputted (S67). By repeating S65 through S67, the yaw rate degeneration control amount $\gamma_{d\_*}$ calculated in S65 is outputted until the measured time T reaches the degeneration time $T_d$. Degeneration control is then carried out for the respective actuators based on the outputted yaw rate degeneration control amount $\gamma_{d\_*}$.

In the case where, in S66, it is determined that the time T measured by the timer is not less than the degeneration time $T_d$ (S66: No), or in other words, in the case where the measured time T has reached the degeneration time $T_d$, the degeneration control amount determination unit 4162*b* ends the present routine. By executing the degeneration control amount determination routine as described thus far, the respective actuators are controlled based on the yaw rate degeneration control amounts $\gamma_{d\_*}$, which is gradually reduced during degeneration control. The lateral motion control performed by the lateral motion control apparatus is then stopped at the time when the magnitude of the yaw rate degeneration control amounts $\gamma_{d\_*}$ of the respective actuators reaches 0. In this manner, by gradually reducing the control amounts of the respective actuators through the degeneration control, a sense of discomfort imparted upon the driver when the lateral motion control is stopped can be reduced.

Figure 16:
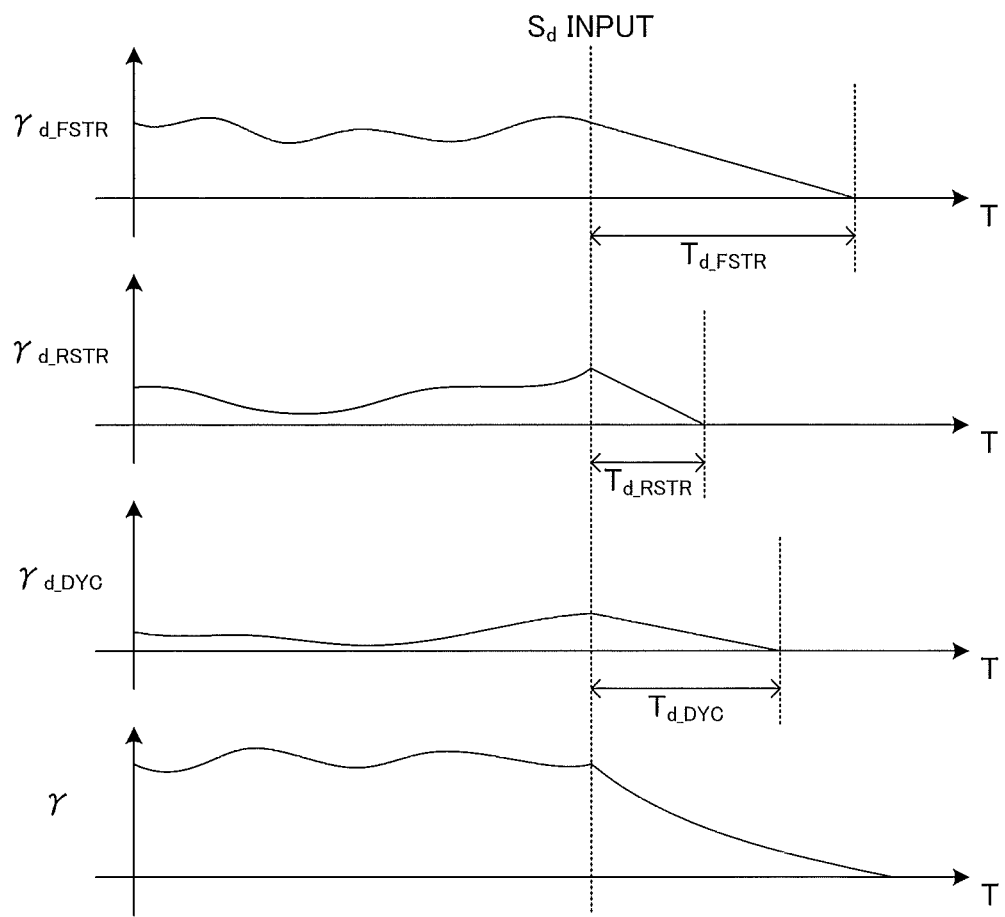
FIG. 16 is a diagram illustrating yaw rate degeneration control amounts and changes in the yaw rate of a vehicle when degeneration control according to the fourth embodiment is executed.

FIG. 16 is a diagram illustrating the yaw rate degeneration control amount $\gamma_{d\_*}$ and changes in the yaw rate y of the vehicle when degeneration control according to the present embodiment is executed. In FIG. 16, the horizontal axis represents time, whereas the vertical axis represents the yaw rate degeneration control amount $\gamma_{d\_*}$ or the yaw rate y of the vehicle.

As shown in, FIG. 16, degeneration control is commenced for the respective yaw rate control amounts when the degeneration request signal $S_d$ is inputted. After the degeneration request signal $S_d$ is inputted, all of the yaw rate degeneration control amounts $\gamma_{d\_*}$ decrease. As mentioned above, the front steering yaw rate degeneration time $T_{d\_RSTR}$ is longer than the rear steering yaw rate degeneration time $T_{d\_RSTR}$ and the DYC yaw rate degeneration time $T_{d\_DYC}$. Furthermore, the DYC yaw rate degeneration time $T_{d\_DYC}$ is longer than the rear steering yaw rate degeneration time $T_{d\_RSTR}$. In general, degeneration control for the front steering yaw rate control amount has the greatest effect on the turning behavior of a vehicle. In other words, among the multiple actuators, controlling the front steering actuator 14 has the greatest effect on the steering operations performed by the driver. Furthermore, degeneration control for the DYC yaw rate control amount has the next greatest effect on the turning behavior of a vehicle. For this reason, by setting the front steering yaw rate degeneration time $T_{d\_FSTR}$ to be the longest and setting the DYC yaw rate degeneration time $T_{d\_DYC}$ to be the next longest, as in the present embodiment, it is possible to gradually degenerate these control amounts, which in turn makes it possible to stabilize the turning behavior of the vehicle during degeneration control. As a result, it is possible to reduce a sense of discomfort due to instabilities in the turning behavior during degeneration control.

(Fifth Embodiment)

Next, a fifth embodiment of the present invention will be described. The configuration of the lateral motion control apparatus according to the present embodiment is basically the same as the configuration of the lateral motion control apparatus described in the above first embodiment, except for the way in which the degeneration control amount determination unit 4162*b* calculates the respective yaw rate degeneration control amounts. In the present embodiment, in the case where the degeneration request signal $S_d$ is inputted and the control rejection signal $S_{\_UA}$ is not inputted into the stop determination unit 4162*a*, the degeneration control amount determination unit 4162*b* obtains the respective yaw rate degeneration control amounts $\gamma_{d\_*}$ by carrying out a low-pass filtering process on the corresponding yaw rate control amounts $\gamma_{\_*}$. In this case, the cutoff frequency for the low-pass filter used to obtain the yaw rate degeneration control amounts $\gamma_{d\_*}$ is the same. The degeneration control amount determination unit 4162*b* outputs the yaw rate degeneration control amounts $\gamma_{d\_*}$ obtained through the low-pass filtering process. During degeneration control, the respective actuators are controlled based on the outputted yaw rate degeneration control amounts $\gamma_{d\_*}$. In this manner, a sense of discomfort imparted upon the driver when the lateral motion control is stopped can be reduced by decreasing the yaw rate control amounts during degeneration control using a low-pass filter. Configurations aside from those described above are the same as in the first embodiment, and therefore descriptions thereof will be omitted.

Figure 17:
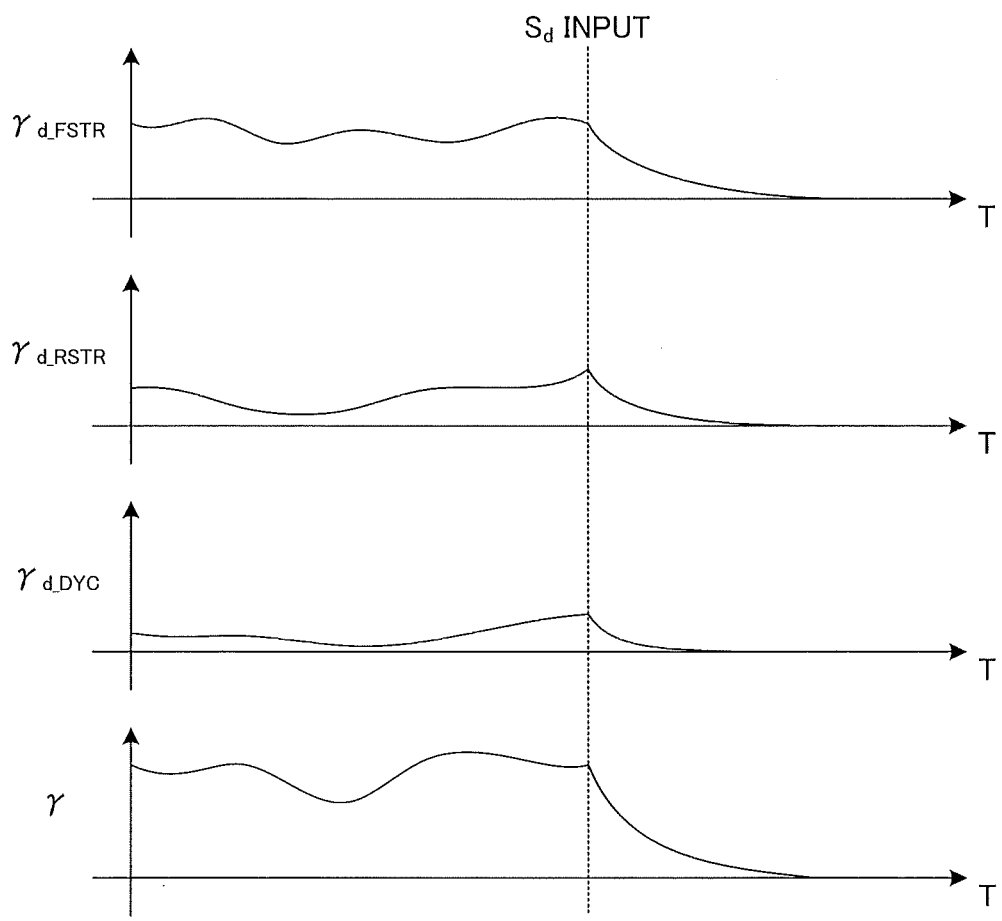
FIG. 17 is a diagram illustrating yaw rate degeneration control amounts and changes in the yaw rate of a vehicle when degeneration control according to a fifth embodiment is executed.

FIG. 17 is a diagram illustrating the yaw rate degeneration control amount $\gamma_{d\_*}$ and changes in the yaw rate y of the vehicle when degeneration control according to the present embodiment is executed. In FIG. 17, the horizontal axis represents time, whereas the vertical axis represents the yaw rate degeneration control amount $\gamma_{d\_*}$ or the yaw rate y of the vehicle.

As shown in FIG. 17, degeneration control is commenced for the respective yaw rate control amounts when the degeneration request signal $S_d$ is inputted. Then, after the degeneration request signal $S_d$ is inputted, all of the yaw rate degeneration control amounts $\gamma_{d\_*}$ decrease. The yaw rate degeneration control amounts $\gamma_{d\_*}$ can be quickly reduced using a simple configuration by carrying out the low-pass filtering process on the corresponding yaw rate control amounts. Furthermore, because the cutoff frequency of the low-pass filter used in order to calculate the respective yaw rate degeneration control amounts $\gamma_{d\_*}$ is the same, the properties with which the yaw rate degeneration control amounts $\gamma_{d\_*}$ decrease are similar. Accordingly, it is possible to reduce a sense of discomfort imparted on the driver due to differences in the properties the yaw rate degeneration control amounts $\gamma_{d\_*}$ decrease during degeneration control.

(Sixth Embodiment)

Next, a sixth embodiment of the present invention will be described. The configuration of the lateral motion control apparatus according to the present embodiment is basically the same as the configuration of the lateral motion control apparatus described in the above first embodiment, except for the way in which the degeneration control amount determination unit 4162*b* calculates the respective yaw rate degeneration control amounts. In the present embodiment, in the case where the degeneration request signal $S_d$ is inputted and the control rejection signal $S_{\_UA}$ is not inputted into the stop determination unit 4162*a*, the degeneration control amount determination unit 4162*b* obtains the respective yaw rate degeneration control amounts $\gamma_{d\_*}$ by processing the yaw rate control amounts $\gamma_{\_*}$ using a filter that has the opposite properties as the oscillation properties of the yaw rate of the vehicle. Here, the "oscillation properties of the yaw rate of the vehicle" indicates the oscillation properties of the yaw rate estimated to occur when the yaw rate control performed by the lateral motion control apparatus 40 is stopped. The yaw rate oscillation properties are investigated in advance, and a filter having the opposite properties as the oscillation properties is set in advance. The respective yaw rate control amounts are inputted into the filter set in this manner when the degeneration control is started, and the yaw rate degeneration control amounts are calculated based on signals outputted from the filter. Degeneration control is then carried out for the respective actuators based on the yaw rate degeneration control amount $\gamma_{d\_*}$ calculated in this manner. Note that configurations aside from those described above are the same as in the first embodiment, and therefore descriptions thereof will be omitted.

Figure 18:
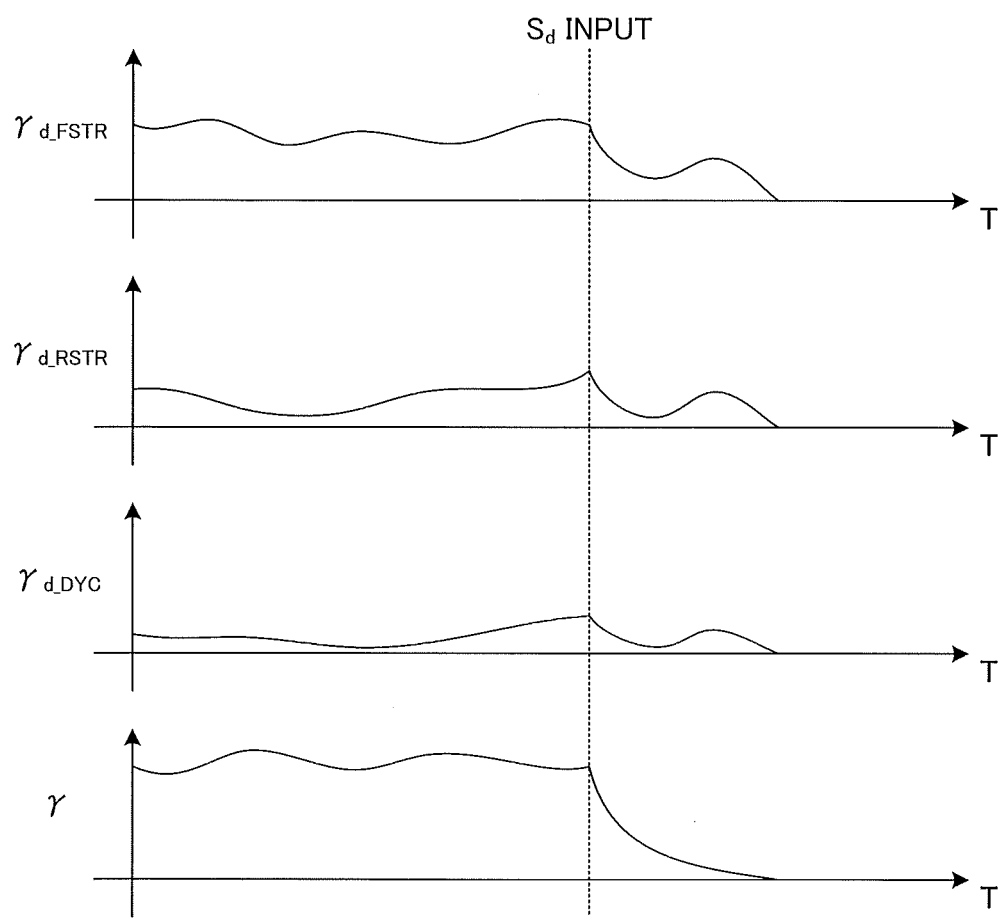
FIG. 18 is a diagram illustrating yaw rate degeneration control amounts and changes in a yaw rate $\gamma$ of a vehicle when degeneration control according to a sixth embodiment is executed.

FIG. 18 is a diagram illustrating the yaw rate degeneration control amount $\gamma_{d\_*}$ and changes in the yaw rate y of the vehicle when degeneration control according to the present embodiment is executed. In FIG. 18, the horizontal axis represents time, whereas the vertical axis represents the yaw rate degeneration control amount $\gamma_{d\_*}$ or the yaw rate y of the vehicle.

As shown in FIG. 18, degeneration control is commenced for the respective yaw rate control amounts when the degeneration request signal $S_d$ is inputted. Then, degeneration control is carried out on the yaw rate after the input of the degeneration request signal $S_d$. The yaw rate degeneration control amount $\gamma_{d\_*}$ is obtained by processing the yaw rate control amount using the filter that has the opposite properties as the oscillation properties of the yaw rate. By controlling the respective actuators based on the yaw rate degeneration control amounts $\gamma_{d\_*}$ obtained in this manner, oscillation in the yaw rate of the vehicle is suppressed during degeneration control. For this reason, it is possible to reduce a sense of discomfort imparted upon the driver due to the yaw rate oscillation during degeneration control, which in turn makes it possible to improve the ride quality.

Exemplary embodiments have been described thus far. According to these embodiments, a lateral motion control apparatus includes a target value obtaining unit (411) that obtains a target value ($\gamma^*$) of a lateral motion amount of a vehicle, a control amount calculation unit (414, 415, 416) that calculates, based on the target value of the lateral motion amount obtained by the target value obtaining unit, lateral motion control amounts for each of a plurality of control targets (14, 22, 32) that operate (actuate) cooperatively in order to change the lateral motion amount of the vehicle, a control target control unit (42, 43, 44) that controls the plurality of control targets based on the lateral motion control amounts, a control stop determination unit (417, 4162*a*) that determines whether or not to stop the control of the plurality of control targets performed by the control target control unit, and a degeneration control amount determination unit (4162*b*) that, when the control stop determination unit has determined that the control of the plurality of control targets is to be stopped, determines lateral motion degeneration control amounts for each of the plurality of control targets so that the lateral motion control amounts of the plurality of control targets degenerate. Further, when the control stop determination unit has determined that the control of the plurality of control targets is to be stopped, the control target control unit controls the plurality of control targets based on the lateral motion degeneration control amount determined by the degeneration control amount determination unit.

According to the embodiments, when the control stop determination unit has determined that the control of the plurality of control targets that are controlled and operated in order to change the lateral motion amount of the vehicle is to be stopped, the degeneration control amount determination unit determines the lateral motion degeneration control amounts for the plurality of control targets. Degeneration control is then carried out on those control targets based on the determined lateral motion degeneration control amounts until the lateral motion control amounts of each of the control targets reaches 0. In other words, a degeneration period for degenerating the lateral motion control amounts of the control targets is provided during the period from when the control stop determination unit has determined that the control of the control targets is to be stopped until the control of the control target stops. By causing the lateral motion control amounts of the respective control targets to degenerate during this degeneration period, it is possible to reduce a sense of discomfort imparted on the driver when lateral motion control is stopped.

In this disclosure, "degeneration" of the lateral motion control amounts refers to reducing the lateral motion control amounts so that the lateral motion control amounts of the control targets approach 0. In this case, as long as the lateral motion control amounts of the control targets ultimately approach 0, it is considered "degeneration" of the lateral motion control amounts, even if a period in which the lateral motion control amounts increase occurs during that degeneration. Furthermore, the control of the control targets carried out based on the lateral motion degeneration control amounts determined by the degeneration control amount determination unit after it has been determined that the control of the control targets is to be stopped is referred to as "degeneration control" in the present disclosure.

It is preferable for the degeneration control amount determination unit to determine the lateral motion degeneration control amounts for the plurality of control targets so that the lateral motion control amounts of all of the control targets reaches 0 within 10 seconds from the time the control stop determination unit has determined that the control of the plurality of control targets is to be stopped. In other words, it is preferable for the time for which degeneration control is carried out on the control targets (that is, the degeneration time) to be less than or equal to 10 seconds. Intensive research has shown that setting the degeneration time to a length that is approximately several tens of times (for example, 50 times) of a response speed that can be sensed by humans (for example, several Hz) does not impart a sense of discomfort during the degeneration and makes it difficult to sense that the degeneration is taking place. Therefore, by setting the degeneration time to less than or equal to a 10 seconds, which is a length that is approximately several tens of times of the response speed that can be sensed by humans, it is possible to quickly degenerate the control amounts of the respective control targets without imparting a sense of discomfort, but while also imparting upon the driver a sense that degeneration control is being carried out.

In addition, it is preferable for the degeneration control amount determination unit to determine the lateral motion degeneration control amounts of the plurality of control targets so that, when a pre-set amount of time has passed after the control stop determination unit has determined that the control of the plurality of control targets is to be stopped, the lateral motion control amounts of all of the control targets reach 0 at the same time. Through this, the control of the control targets is stopped at the same time, which makes it possible to reduce a sense of discomfort imparted due to only certain control targets being controlled during the degeneration control.

In addition, it is preferable for the degeneration control amount determination unit to determine the lateral motion degeneration control amounts for the plurality of control targets so that the degeneration speeds of the lateral motion control amounts for all of the control targets are the same when the control stop determination unit has determined that the control of the plurality of control targets is to be stopped. Through this, the speeds at which the lateral motion degeneration control amounts of all of the control targets change (that is, the degeneration velocities) are set to be the same. For this reason, it is possible to reduce a sense of discomfort imparted due to differences in the degeneration speeds of the lateral motion degeneration control amounts for the plurality of control targets.

In addition, it is preferable for the degeneration control amount determination unit to determine the lateral motion degeneration control amounts for the plurality of control targets so that the degeneration time for which the control targets are controlled based on the lateral motion degeneration control amounts is longer the greater the lateral motion control amounts of the control targets are when the control stop determination unit has determined that the control of the control targets is to be stopped (that is, when degeneration control starts). The greater the lateral motion control amount for a control target is when degeneration control starts, the greater an effect the degeneration control will have on the turning behavior of the vehicle when the degeneration control is carried out on that control target. Therefore, setting the degeneration time to be longer for control targets that have a greater effect on the turning behavior of the vehicle makes it possible to stabilize the turning behavior of the vehicle during degeneration control. As a result, it is possible to reduce a sense of discomfort imparted on the driver due to instabilities in the turning behavior arising during degeneration control.

In addition, it is preferable for the degeneration control amount determination unit to determine the lateral motion degeneration control amounts for the plurality of control targets so that the amount of time for which the control targets are being controlled based on the lateral motion degeneration control amounts (that is, the degeneration times) are longer the greater the effect the control is on the turning behavior of the vehicle in the case where each control target is controlled based on the lateral motion degeneration control amounts determined by the degeneration control amount determination unit. In this case, it is preferable for the degeneration control amount determination unit to include an effect index calculation unit (S55) that calculates, for each of the respective control targets, an effect index representing the magnitude of the effect the control has on the turning behavior of the vehicle in the case where the control targets are controlled based on the lateral motion degeneration control amounts determined by the degeneration control amount determination unit. Furthermore, it is preferable for the degeneration control amount determination unit to determine the lateral motion degeneration control amounts for the plurality of control targets so that the amount of time for which the control targets are controlled based on the lateral motion degeneration control amounts (that is, the degeneration time) is longer the greater the effect index calculated by the effect index calculation unit is. Through this, control targets that have a greater effect on the turning behavior of the vehicle undergo gradual degeneration control by setting the degeneration time for the control targets that have a greater effect on the turning behavior of the vehicle to be longer. Accordingly, the turning behavior of the vehicle can be stabilized during degeneration control. As a result, it is possible to reduce a sense of discomfort imparted on the driver due to instabilities in the turning behavior arising during degeneration control.

It is preferable for the effect index calculation unit to calculate the effect index based on the lateral motion control amounts of the control targets at the start of degeneration control and effect coefficients representing the magnitude of the effects that the operations of the respective control targets have on the turning behavior of the vehicle. It is further preferable for the effect index calculation unit to calculate the effect index by multiplying the lateral motion control amounts of the respective control targets at the start of degeneration control by the effect coefficients.

Meanwhile, it is preferable for the plurality of control targets to include a front-steering actuator (14) that operates a front steering apparatus (10) that changes the lateral motion of the vehicle by steering the front wheels of the vehicle. Furthermore, it is preferable for the degeneration control amount determination unit to determine the lateral degeneration control amounts of the plurality of control targets so that, during degeneration control, the amount of time required for the lateral motion control amount of the front steering apparatus (front-steering actuator) to reach 0 (that is, the degeneration time) is longer than the amount of time required for the lateral motion control amounts of the other control targets to reach 0 (the degeneration time).

In general, the lateral motion control of the front steering apparatus (the front-steering actuator) has the greatest effect on the turning behavior of the vehicle. Accordingly, it is possible to stabilize the turning behavior of the vehicle during degeneration control by setting the degeneration time for the front steering apparatus (the front-steering actuator) to be long. As a result, it is possible to reduce a sense of discomfort imparted on the driver due to instabilities in the turning behavior arising during degeneration control.

In addition, it is preferable for the degeneration control amount determination unit to determine the lateral motion degeneration control amounts of the plurality of control targets so that the lateral motion control amounts of the plurality of control targets are processed by a low-pass filter, in which the same cutoff frequency is set, at the start of degeneration control. Through this, the lateral motion control amounts of the control targets are dampened by the low-pass filter during degeneration control, and thus the lateral degeneration control amounts are quickly reduced. Accordingly, the lateral motion control of the control targets can be stopped quickly.

In addition, it is preferable for the degeneration control amount determination unit to determine the lateral motion degeneration control amounts for the plurality of control targets by processing the lateral motion control amounts of the plurality of control targets calculated by the control amount calculation unit when the control stop determination unit has determined that the control of the plurality of control targets is to be stopped, using a filter that has the opposite oscillation properties as the oscillation properties of the turning behavior of the vehicle that are estimated to occur when the control of the plurality of control targets is stopped. Through this, oscillation in the turning behavior, occurring when the lateral motion control of the vehicle performed by the lateral motion control apparatus is stopped, is suppressed by controlling the control targets based on the lateral motion degeneration control amounts process using the above-mentioned filter.

In addition, it is preferable for the degeneration control amount determination unit to include a control rejection determination unit (S32, S42, S52, S62) that determines whether or not it is impossible to control one or more of the plurality of control targets based on the control amounts calculated by the control amount calculation unit. Furthermore, it is preferable for the degeneration control amount determination unit to immediately set the lateral motion control amounts of all of the plurality of control targets to 0 when the control rejection determination unit has determined that it is impossible to control one or more of the plurality of control targets based on the control amounts calculated by the control amount calculation unit. In the case where the control of at least one of the plurality of control targets is impossible, even if a lateral motion degeneration control amount is determined for that control target, the control target cannot be controlled in accordance with the determined lateral motion degeneration control amount. Furthermore, there is a risk that the stability of travel of the vehicle will be degraded by the control target that cannot be controlled operating. Accordingly, in the embodiment, the control of all of the control targets is immediately stopped in such a case. Although immediately stopping the control of all of the control targets will impart a sense of discomfort on the driver, it is possible to prevent degradation in the stability of travel due to control targets that cannot be controlled operating.

The present invention is not intended to be limited to the aforementioned embodiments. For example, although the above-mentioned third embodiment illustrates an example in which longer degeneration time is set for greater effect indexes obtained based on the product of the yaw rate control amounts of the respective actuators and the effect coefficients, longer degeneration time may be set for greater yaw rate control amounts. Further, the degeneration time of the actuator having less effect index may be set to 0. Furthermore, although the DYC actuator is an actuator that imparts a braking force on the vehicle wheels (that is, is a braking actuator) in the aforementioned embodiments, the DYC actuator may be an actuator that imparts a driving force on the vehicle wheels (that is, an in-wheel motor). In this manner, the present invention may be varied as long as such variations do not depart from the essential spirit of the present invention.

The invention claimed is:

1. A lateral motion control apparatus comprising:
a target value obtaining unit that obtains a target value of a lateral motion amount of a vehicle;
a control amount calculation unit that calculates, based on the target value of the lateral motion amount obtained by the target value obtaining unit, lateral motion control amounts for each of a plurality of control targets that operate cooperatively in order to change the lateral motion amount of the vehicle;
a control target control unit that controls the plurality of control targets based on the lateral motion control amounts;
a control stop determination unit that determines whether or not to stop the control of the plurality of control targets performed by the control target control unit; and
a degeneration control amount determination unit that, when the control stop determination unit has determined that the control of the plurality of control targets is to be stopped, determines lateral motion degeneration control amounts for each of the plurality of control targets so that the lateral motion control amounts of the plurality of control targets degenerate,
wherein, when the control stop determination unit has determined that the control of the plurality of control targets is to be stopped, the control target control unit controls the plurality of control targets based on the lateral motion degeneration control amounts determined by the degeneration control amount determination unit.

2. The lateral motion control apparatus for a vehicle according to claim 1,
wherein the degeneration control amount determination unit determines the lateral motion degeneration control amounts for the plurality of control targets based on a predetermined degeneration time so that the lateral motion control amounts of all of the control targets reaches 0 when the control stop determination unit has determined that the control of the plurality of control targets is to be stopped, and the predetermined degeneration time is set to be within 10 seconds.

* * * * *